US009648169B2

(12) United States Patent
Lum et al.

(10) Patent No.: US 9,648,169 B2
(45) Date of Patent: *May 9, 2017

(54) SYSTEM AND METHOD FOR WEB-BASED REAL TIME COMMUNICATION WITH OPTIMIZED TRANSCODING

(71) Applicant: Genesys Telecommunications Laboratories, Inc., Daly City, CA (US)

(72) Inventors: Henry Lum, Markham (CA); Anthony Lam, Richmond Hill (CA); Vyacheslav Sayko, Walnut Creek, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,219

(22) Filed: Dec. 4, 2015

(65) Prior Publication Data
US 2016/0165051 A1    Jun. 9, 2016

Related U.S. Application Data

(63) Continuation of application No. 14/477,824, filed on Sep. 4, 2014, now Pat. No. 9,210,266, which is a
(Continued)

(51) Int. Cl.
*H04M 3/00* (2006.01)
*H04M 5/00* (2006.01)
(Continued)

(52) U.S. Cl.
CPC ...... *H04M 3/5191* (2013.01); *H04L 65/1069* (2013.01); *H04L 65/601* (2013.01);
(Continued)

(58) Field of Classification Search
CPC ..... H04M 3/51; H04M 3/5183; H04M 3/5191
(Continued)

(56) References Cited

U.S. PATENT DOCUMENTS 6,493,447 B1   12/2002   Goss et al.
6,697,481 B2   2/2004    Matsumoto
(Continued)

FOREIGN PATENT DOCUMENTS

EP    1885104 A1       2/2008
KR    1020080097062 A  11/2008
(Continued)

OTHER PUBLICATIONS

International Search Report and Written Opinion for PCT/US2013/068556, mailed on Feb. 21, 2014, 16 pages.
(Continued)

*Primary Examiner* — Thjuan K Addy
(74) *Attorney, Agent, or Firm* — Lewis Roca Rothgerber Christie LLP

(57) ABSTRACT

A system and method is provided to allow for real-time communication between a web browser application and a contact center resource, where media codecs supported by the two parties may differ. A processor is configured to bridge the media exchanged between the browser and contact center resource. In bridging the media, the processor transcodes the media based on a first media codec for media directed to and from the web browser application, and further transcodes the media based on the second media codec for media directed to and from a contact center resource.

20 Claims, 18 Drawing Sheets

Related U.S. Application Data continuation of application No. 13/956,271, filed on Jul. 31, 2013, now Pat. No. 8,867,731.

(51) Int. Cl.
*H04L 12/66* (2006.01)
*H04M 3/523* (2006.01)
*H04M 3/51* (2006.01)
*H04L 29/06* (2006.01)

(52) U.S. Cl.
CPC ....... *H04M 3/5133* (2013.01); *H04M 3/5183* (2013.01); *H04M 3/523* (2013.01)

(58) Field of Classification Search
USPC .................. 379/265.09, 265.01, 265.05, 352; 709/227
See application file for complete search history.

(56) References Cited

U.S. PATENT DOCUMENTS

| | | | |
|---|---|---|---|
| 6,792,102 | B2 | 9/2004 | Shires |
| 7,623,650 | B2 | 11/2009 | Dalton et al. |
| 7,636,348 | B2 | 12/2009 | Bettis et al. |
| 7,929,952 | B2 | 4/2011 | Kelly et al. |
| 7,974,714 | B2 * | 7/2011 | Hoffberg ............ G06K 9/00369 360/75 |
| 8,018,921 | B2 | 9/2011 | Pogossiants et al. |
| 9,131,067 | B2 | 9/2015 | Sayko |
| 2001/0038624 | A1 | 11/2001 | Greenberg et al. |
| 2003/0128833 | A1 | 7/2003 | Peters |
| 2004/0039775 | A1 | 2/2004 | Yoshida et al. |
| 2005/0002514 | A1 | 1/2005 | Shafiee et al. |
| 2005/0141694 | A1 | 6/2005 | Wengrovitz |
| 2007/0061468 | A1 | 3/2007 | Kelly et al. |
| 2007/0116238 | A1 | 5/2007 | Jacobi et al. |
| 2007/0287430 | A1 | 12/2007 | Hosain et al. |
| 2008/0043725 | A1 | 2/2008 | Wan |
| 2008/0260135 | A1 | 10/2008 | Siegrist |
| 2009/0187455 | A1 | 7/2009 | Fernandes et al. |
| 2010/0158236 | A1 | 6/2010 | Chang et al. |
| 2012/0190333 | A1 | 7/2012 | Portman et al. |
| 2012/0278115 | A1 | 11/2012 | Acharya et al. |
| 2012/0297031 | A1 | 11/2012 | Danielsson Fan et al. |
| 2012/0320903 | A1 | 12/2012 | Ilagan |
| 2012/0320904 | A1 | 12/2012 | Ilagan |
| 2012/0320905 | A1 | 12/2012 | Ilagan |
| 2012/0324375 | A1 | 12/2012 | Mathews |
| 2014/0095596 | A1 | 4/2014 | Singh |
| 2014/0126714 | A1 | 5/2014 | Sayko |
| 2015/0358467 | A1 | 12/2015 | Sayko |

FOREIGN PATENT DOCUMENTS

| | | |
|---|---|---|
| WO | 2012065658 A1 | 5/2012 |
| WO | 2015017471 A1 | 2/2015 |

OTHER PUBLICATIONS

International Search Report and Written Opinion for PCT/US2014/048746, dated Dec. 1, 2014, 9 pages.
Jennings, C. et al., RTCWeb Offer/Answer Protocol (ROAP) draft-jennings-rtcweb-signaling-01, Network Group, Internet Draft expired on May 2, 2012, IETF Trust, 2011, 11 pgs.
Rosenberg, J. et al., SIP: Session Initiation Protocol, The Internet Society, Copyright 2002, 2 pgs.
European Supplementary Search Report for Application No. 13851607.5, dated Mar. 23, 2016, 9 pages.
Extended European Search Report for European Application No. 14831423.0, dated Jun. 13, 2016, 8 pages.
Johnston, A. et al., Taking on WebRTC in an Enterprise, IEEE Communications Magazine, IEEE Service Center, vol. 51, No. 4, XP011499934, Piscataway, US, 8 pages.
Kaplan, H., Requirements for Interworking WebRTC with Current SIP Deployments; draft-kaplan-rtcweb-sip-internetworking-requirements-02, Internet Engineering Task Force, Internet Society (ISOC) 4, Nov. 22, 2011, Geneva, Switzerland, XP015079523, 24 pages.

* cited by examiner

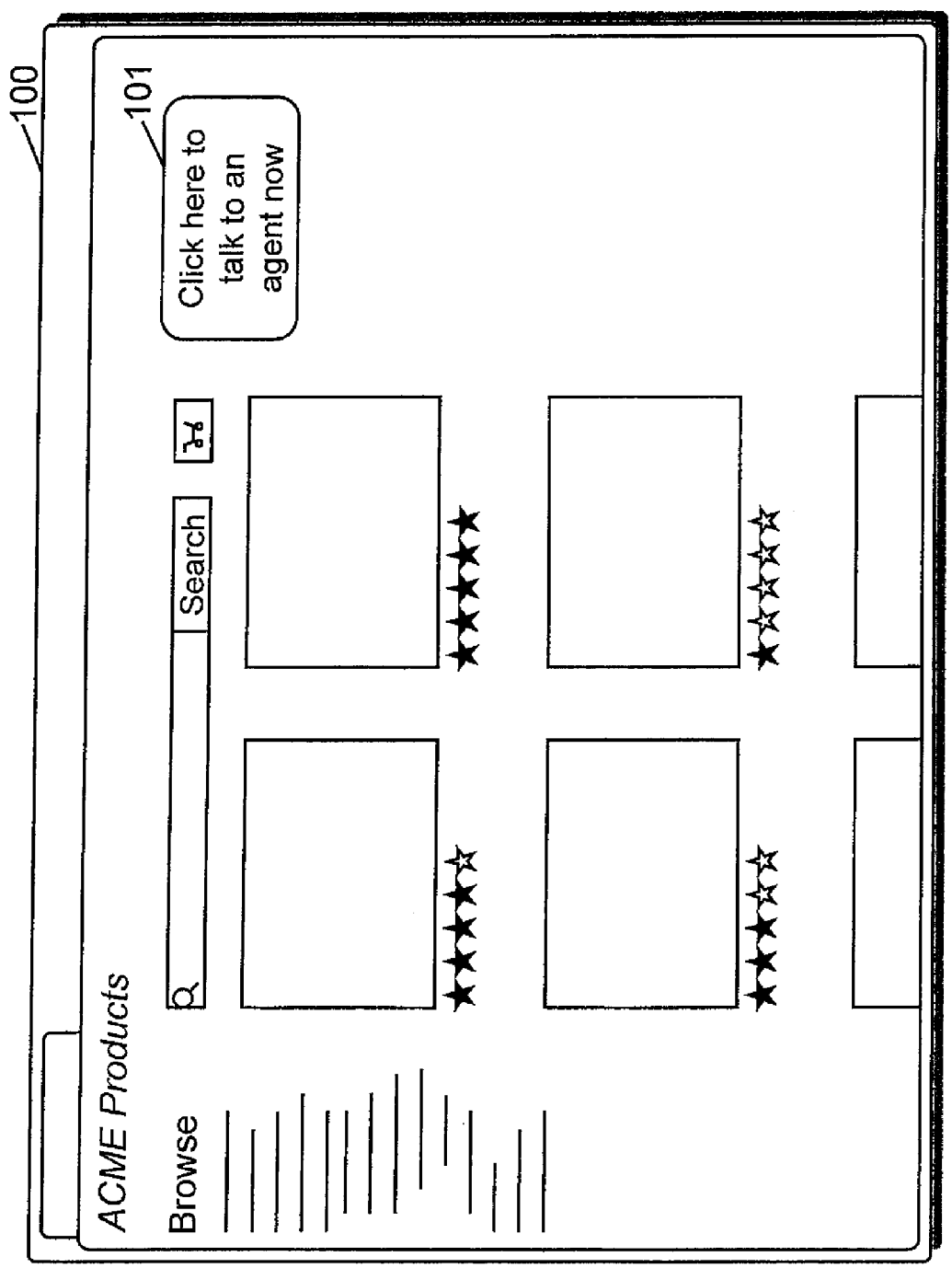

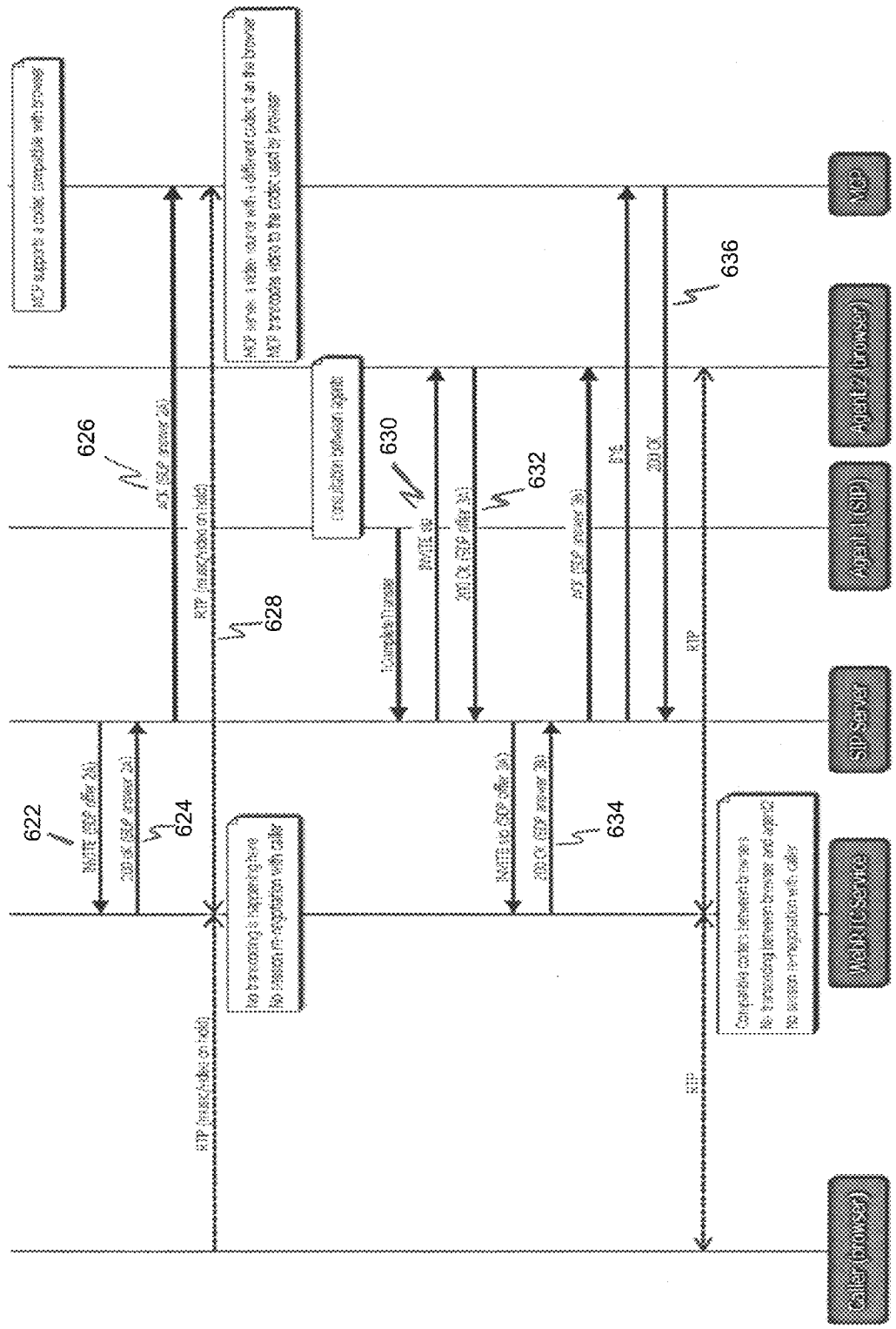

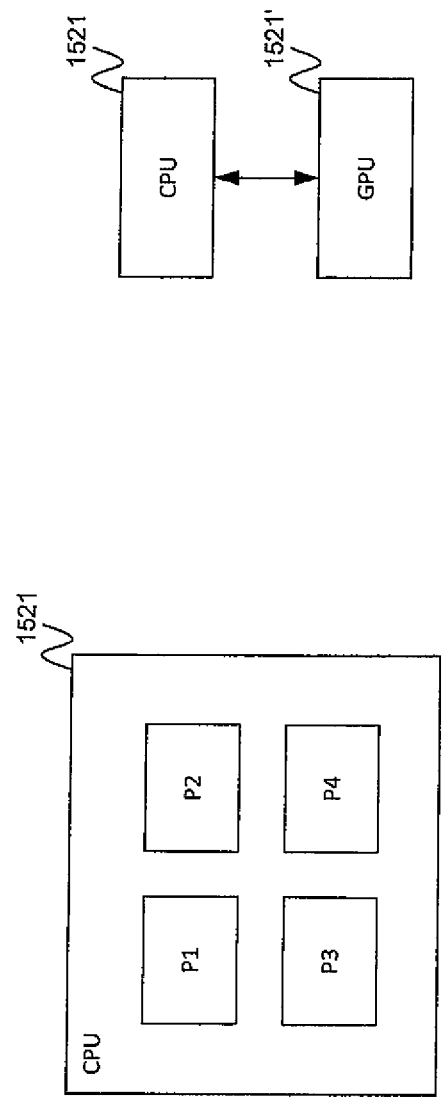

SYSTEM AND METHOD FOR WEB-BASED REAL TIME COMMUNICATION WITH OPTIMIZED TRANSCODING

CROSS-REFERENCE TO RELATED APPLICATIONS

This application is a continuation of U.S. patent application Ser. No. 14/477,824, filed on Sep. 4, 2014, now U.S. Pat. No. 9,210,266, which is a continuation of U.S. patent application Ser. No. 13/956,271 filed on Jul. 31, 2013, now U.S. Pat. No. 8,867,731, which are related to of U.S. patent application Ser. No. 13/669,384, filed on Nov. 5, 2012 and U.S. patent application Ser. No. 13/669,288, filed on Nov. 5, 2012, the disclosures of which are incorporated herein by reference.

FIELD

Embodiments of the present invention are directed to systems and methods for operating contact centers, and more particularly, to systems and methods for communicating with users using web browser based communication channels.

BACKGROUND

In the field of customer communications and services, an organization such as a retail company, a service company, or a non-profit organization may operate a website for providing information to customers and clients and/or for providing an entry point of communication with a contact center. In addition to the website, the organization may also operate a contact center (e.g. customer service or sales contact center) staffed by people who communicate with customers via a telephone or other audio/visual communication channel, interactive text chat systems, short message service (SMS), social media, co-browsing, emails, letters, fax, etc.

Generally, visitors to an organization's website are presented with information and opportunities for contacting representatives of the organization at the contact centers. These opportunities are typically presented as toll-free numbers (e.g., "1-800" numbers) for voice communications and/or chat boxes or windows integrated into a web page for real-time text-based communications. In some circumstances, a user is given the opportunity to fill out a form to indicate what they would like to speak about and to provide their telephone number for a representative of the organization to call the user (either immediately or at a designated time) using the public switched telephone network (PSTN).

However, operating toll-free numbers and maintaining a sufficiently large number of PSTN lines can often be expensive for organizations. In addition, voice communication over a PSTN connection is generally limited to audio and is substantially separate from and independent of the particular browser session currently being used by the caller.

Many organizations often use Data Network Telephony (DNT) or computer-simulated telephony to provide increased flexibility in handling higher numbers of calls through the use of shared, connectionless data networks such as the Internet. In such DNT systems, high loads can be handled by, for example, gracefully degrading call quality during peak usage through Quality of Service (QoS) mechanisms. For example, a DNT system may be implemented in part using telephones and gateways based on a voice-over-IP (VoIP) protocol such as, the Session Initiation Protocol (SIP), as described, in part, in Internet Engineering Task Force (IETF) Request for Comments (RFC) 2543, 3261, and 3262.

Whether the contact centers use PSTN lines, DNT connections, other types of telephonic communication systems, or combinations thereof, the contact centers typically include some system for routing incoming calls to the appropriate resources. Such a system may include an interactive voice response (IVR) system. The call can be connected to an IVR either before reaching the contact center switch, such as at the service control point (SCP) level or after reaching the contact center switch, such as through contact center routing mechanisms. During an IVR interaction, a voice application (or a chain of voice applications) is played for the caller and the caller interacts with menu options that are played by the voice application (e.g., "For new sales, press 1. For product support, press 2."). Other IVR systems may also or alternatively provide voice recognition systems (e.g., "Which flight would you like to know the status of? You can say the flight number or enter it on your keypad"). Interaction with such enunciated voice menus may often be difficult. This may be due in part to confusion because of the recitation of many options presented serially to the caller through the voice interface. Often a caller replays the menu and listens to the available options multiple times before selecting an option. This creates delay in the system that could lead to delays in call processing and to reductions in call processing efficiency, and may sometimes result in callers abandoning calls due to frustration.

Accordingly, what is desired are economical systems and methods for customers browsing a website to communicate with agents and other resources at the contact center even if the capabilities of the devices at the contact center differ from the capabilities of the devices used by the customers.

SUMMARY

Embodiments of the present invention are directed to system and method for real-time communication between a customer and a contact center resource. A processor receives a first offer for a browser-based call from a web browser application. The first offer includes a first media codec supported by the web browser application. The processor modifies the first offer and generates a second offer having a second media codec supported by the processor. In generating the second offer, the processor deletes the first media codec or adds the second media codec to a list containing the first media codec. The processor transmits the second offer for receipt by the contact center resource. In response to the second offer, the contact center resource generates an answer including a selection of the second media codec in the second offer. The processor then bridges media exchanged between the web browser application and the contact center resource during the real-time communication. In bridging the media, the processor transcodes the media based on the first media codec for media directed to and from the web browser application, and further transcodes the media based on the second media codec for media directed to and from the contact center resource.

According to one embodiment, the contact center resource is a contact center agent device. The contact center agent device may support an agent web browser application for engaging in a browser-based call with the web browser application requesting the browser-based call.

According to one embodiment, the contact center agent device includes a voice-over-IP client for engaging in a voice-over-IP call with the web browser application requesting the browser-based call. According to one embodiment, the processor establishes a web browser call leg with the web browser application according to a web signaling protocol, and establishes a voice-over-IP call leg with the contact center agent device according to a voice-over-IP signaling protocol.

According to one embodiment, in generating the second offer, the processor is configured to list the media codecs in the second offer in an order of preference for selection by the contact center resource according to the listed order of preference.

According to one embodiment, the processor deletes the first media codec in generating the second offer if the first media codec is not supported by the processor.

According to one embodiment, the real-time communication is transferred to a second contact center resource for exchanging real-time media between the web browser application and the second contact center resource, wherein the transfer is without changing a peer connection.

According to one embodiment, the processor negotiates a media codec for use for the real-time communication between the processor and the second contact center resource. The negotiating may include receiving by the processor an offer from the second contact center resource including a third media codec supported by the second contact center resource; and transmitting by the processor an answer including a media codec selected based on knowledge of media codecs supported by the web browser application. According to one embodiment, the knowledge is acquired without re-negotiating a media session with the web browser.

According to one embodiment, the second contact center resource is a media controller configured to deliver a music media service for the web browser application. If the web browser application supports the third media codec, the media controller delivers the music media service according to the third media codec. If the web browser application does not support the third media codec, the media controller transcodes the music to a media codec supported by the web browser application prior to delivering the music media service to the web browser application.

According to one embodiment, the negotiating between the processor and the second contact center resource is without re-negotiating a media session with the web browser application.

According to one embodiment, the real-time communication is upgraded from an audio only communication to an audio and video communication. The upgrading includes receiving by the processor a message from the contact center resource for adding video to the real-time communication; negotiating attributes for the video between the processor and the web browser application, wherein in response to the negotiating, the web browser application displays a video stream transmitted by the contact center resource and further displays a prompt for receiving the customer's consent for the web browser application to access a customer camera; and in response to receipt of the customer's consent, transmitting by the web browser application a video stream captured by the customer camera to the contact center resource.

Embodiments of the present invention are also directed to a method for real-time communication between a customer and a contact center resource, where the method includes: receiving by a processor a first request for a browser-based call from a web browser application, the first request adhering to a web signaling protocol; establishing by the processor a first call leg with the web browser application; generating by the processor a second request for a voice-over-IP call, the second request adhering to a voice-over-IP protocol; receiving the second request by a call controller and identifying a contact center resource in response; establishing by the processor a second call leg with the identified contact center resource; and bridging by the processor media exchanged between the web browser application and the contact center resource during the real-time communication.

As a person of skill in the art should recognize, embodiments of the present invention allow both premise and cloud based contact center to use the browser as the "last mile" connect with the contact center. The entire contact center solution may be delivered to a business without the need for additional telephony equipment on the business premise. Agents will simply use the browser as the desktop application as well as the communication device.

The WebRTC service mechanism according to embodiments of the present invention also allows the business web site to collect customer data before placing a WebRTC call to the contact center. This allows business attached data about the customer context without the customer needing to go through an IVR. The contact center routing strategy can use this attached data to find agents with proper skills to answer the call. The agent also will be able to get the full context data about the customer when the call is answered.

Embodiments of the present invention also allow integration of existing contact center media services including IVR. Within a single WebRTC session, the contact center is able to deliver multiple media services without the need to change the peer connection on the browser side. The WebRTC Service has a transcoding service built-in to ensure endpoints (e.g. browser-to-SIP) with incompatible codecs can communicate. The WebRTC service and the contact center also provide intelligent codec negotiation to ensure that whenever media service (IVR, music-on-hold) is provided, the components will avoid the problem of multiple transcoding in the same session if, for example, the IVR or media controller also acts as a transcoder.

Embodiments of the present invention also allow a customer to start with an audio-only call to the contact center. When the agent is reached, the agent can request to upgrade the call to audio+video. In this regard, the agent shows the video stream first and then requests the customer to grant access to the agent to see the customer's video.

Contact center agents can use the WebRTC service to authorize and authenticate the communication device with the contact center. The mechanism uses the same authorization module for all other SIP communication devices.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 5A is a schematic diagram of a browser window on a customer end-user device according to one exemplary embodiment of the present invention.

FIGS. 9A-9B are diagrams of signaling messages exchanged during the handling of a WebRTC call into the contact center according to one embodiment of the invention.

FIG. 11C is a block diagram of a computing device according to an embodiment of the present invention.

FIG. 11D is a block diagram of a computing device according to an embodiment of the present invention.

DETAILED DESCRIPTION

Figure 1:
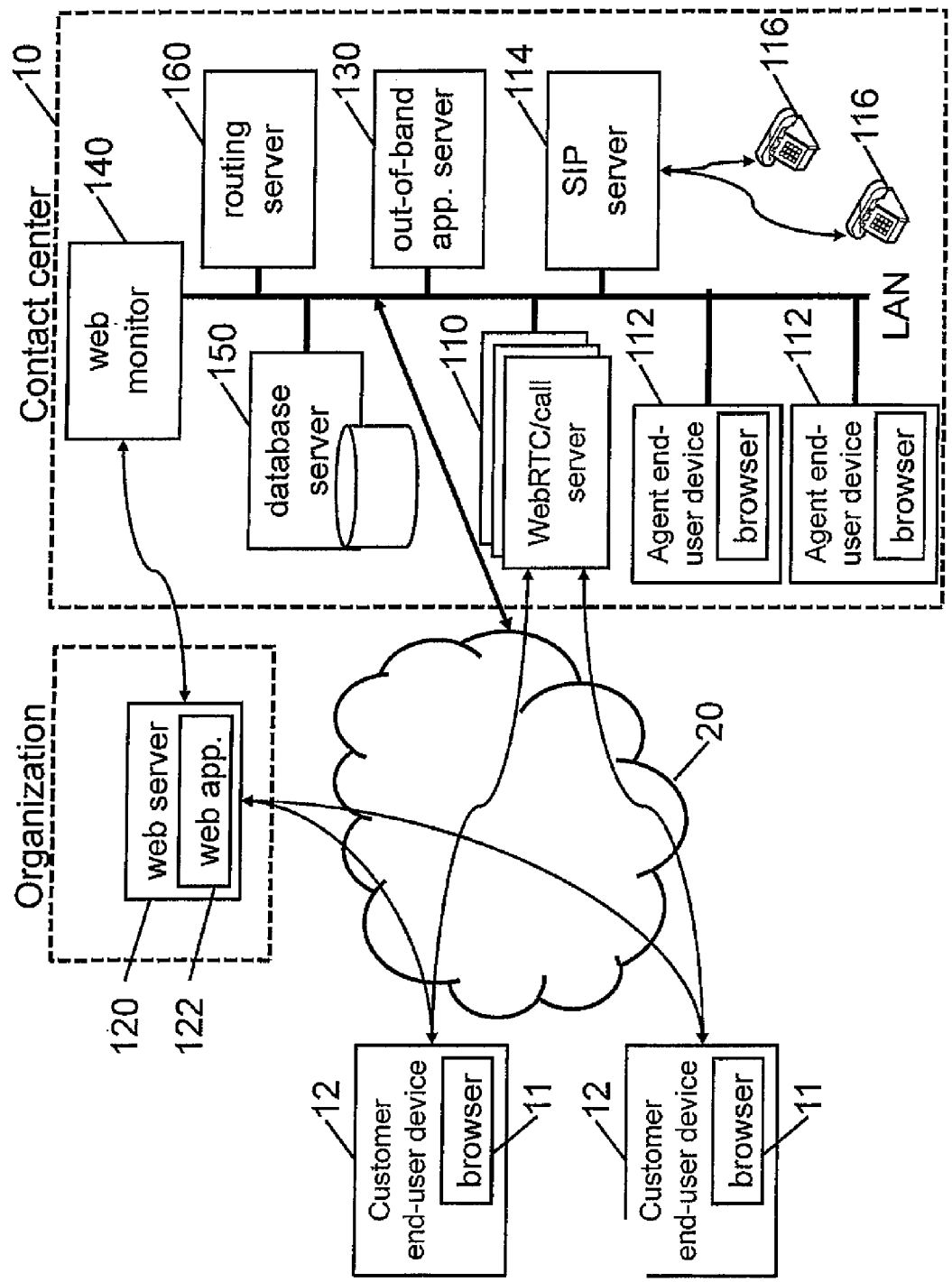
FIG. 1 is a block diagram of a system for web browser-based communication between users and customer contact centers according to one exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Exemplary embodiments of the present invention are directed to a system and method for establishing one or more communications channels with visitors to a website and a customer service representative (also referred to as an agent) using a web browser-based communication system. Such a system may be, for example, a Web real-time communication (WebRTC) system. WebRTC, which is also known as RTCWeb, enables a web browser to provide real-time communications (RTC) capabilities via JavaScript application programming interfaces (APIs) without requiring a user to actively download and install additional software and essentially makes bidirectional media processing and media coding technologies available in every browser. WebRTC technology puts a media engine into a browser or into other elements of client devices. The media engine is the technology that manages microphones, cameras, and speakers and gets audio and video onto and off the internet. Thus, a visitor to the website desiring to speak to an agent simply actuates a call button displayed on the website, and a voice and/or video connection is formed between the visitor and an agent over, e.g. the Internet, without requiring that the visitor install any standalone applications or browser plug-in. The visitor also need not leave his/her current web browsing session and initiate a separate call session for engaging in a web browser based voice communication with the agent.

In one exemplary embodiment of the present invention, the user's activity on the website is monitored and information derived from monitoring the activity is used to determine whether or not to offer a live agent (e.g., a live communication with a customer service representative). If offered a live contact, the user may choose to speak to an agent (e.g., via text chat, telephone, WebRTC, or another teleconferencing service). The organization may route the user to an agent based on the user's prior activity on the website. For example, a first user looking primarily at a particular category of products (e.g., laptops) available for sale on the website may be directed to a sales agent with specialized knowledge of that category. As another example, a second user browsing portions of the website associated with troubleshooting problems associated with a particular product may be routed to a customer support agent such as a technical support agent. As a third example, a customer browsing a Spanish or Chinese version of the website may be routed to a Spanish or Chinese speaking customer service representative, respectively.

According to one exemplary embodiment of the present invention, a user may utilize an out-of-band (OOB) or supplemental channel for providing and receiving additional information to and from agents and end users before, during, and/or after a call, e.g., by telephone, WebRTC, or other voice over IP communication channel. In some embodiments, the OOB channel is dynamically offered by the contact center through the web server such that the decision to offer the OOB channel is made by the contact center and the user is provided the option to accept or ignore this channel. According to one exemplary embodiment, the OOB or supplemental channel may include any communication channel which is logically linked to the real time communication channel used for video and/or audio conversation between agents and end users but may be separate from the real time communication channel with respect to the protocol and transmission. For example, the display of the OOB channel data could be either separated from or grouped with the real time communication display. According to one embodiment of the present invention, the OOB channel is used to display of pictures or movies, or a graphical presentation of an IVR selection menu. In some embodiments, the additional information may be received via the OOB channel after establishing a call but before connecting the call with an agent. In other embodiments, when the additional information is received via the OOB channel before establishing a call, it may be used to assist in routing the user to an appropriate agent.

In some embodiments, when the customer initiates a call using WebRTC, the contact center actively initiates or offers an OOB or supplemental channel to the user to, for example, show the graphical presentation of the IVR menu and for the agent to push content to the user. For example, according to one exemplary embodiment of the invention, the OOB channel may also be a text chat window where the additional information is exchanged between agents and end users via text chat. The OOB channel may also be, for example, a medium for sharing images (e.g., screenshots), recorded videos, documents (e.g., tutorials and order forms), links to other web pages, and/or a medium for sharing screens (e.g., using remote desktop technology such as remote framebuffer, Microsoft® Remote Desktop Services®, and other similar technologies). The OOB channel may also provide a backup communication channel if WebRTC is unreliable due to an unstable a poor Internet connection. Furthermore, the OOB channel can provide data without being restricted by quality of service (QoS) requirements that may be in place for data that is transferred in an in-band channel, such as a WebRTC channel.

In some exemplary embodiments, in addition or in lieu of any information provided via the OOB channel, the agents may also be with supplied information regarding the user's browsing history on the organization's website and, if available, the users' responses to web browser-based forms, in order to provide the agent with a better understanding of the issues the user may be facing.

FIG. 1 is a block diagram of a system for web browser-based communication system between web users and customer contact centers according to one exemplary embodiment of the present invention. A user or customer may use a web browser 11 installed in an end-user device 12 to access a web server 120 via a data communications network 20 such as, for example, the Internet. The end-user device 12 may be a standard desktop or portable computer, tablet, smartphone, television, game console, or any other device capable of running a web browser as is conventional in the art. The web server 120 may be configured to host a web application or website 122 that provides information such as features and specifications of products or services available from an organization and/or technical support for those products or services. The web server 120 may also be configured to drive the WebRTC sessions and the OOB communication channel to the web browser 11 by supplying, for example, JavaScript code.

According to one exemplary embodiment, a contact center 10 may be operated by the organization or by another entity. The contact center 10 may, according to one example, include a WebRTC/call server or gateway 110 for receiving incoming requests to establish WebRTC calls (also simply referred to as a browser call), and a routing server 160 for routing incoming requests from the WebRTC/call server 110 to appropriate agents at the contact center. According to one embodiment, the WebRTC/call server 110 is configured to receive and establish WebRTC sessions and acts as a gateway between WebRTC and SIP. According to one embodiment, the WebRTC call is converted into a SIP call and sent to a SIP server 114. The routing server 160 receives a request from the SIP server to route the SIP call, and in response, the routing server returns instructions as to where to route the call. If the agent has access to a SIP enabled device, the call is routed to the SIP enabled device using SIP. If the agent has access to a WebRTC enabled device, the SIP server instructs the WebRTC/call server 110 to route the call to the agent device as a WebRTC call. The agents may be reached at one or more agent devices 112 which may include, for example, desktop or portable computers, tablets, smartphones, or any other device capable of running a web browser, or at agent telephones 116. The agent telephones 116 may be, for example, SIP phones for engaging in VoIP communication via, for example, the SIP server 114.

According to one exemplary embodiment, the contact center also includes a web monitor 140 for monitoring customer's activity on the web server 120. In other embodiments, the web monitor 140 may be hosted by the organization and may be a software module running on the web server 120 or on a separate server. Systems and methods for monitoring a customer or web visitor are described in more detail in, for example, in U.S. application Ser. No. 13/293,575 filed in the United States Patent and Trademark Office on Nov. 10, 2011, and titled "SYSTEM FOR INTERACTING WITH A WEB VISITOR," the entire disclosure of which is incorporated herein by reference.

The contact center may also include a database server 150 for storing information relating to the customers and their interactions with the organization and the contact center. Such information may include, for example, historical data collected by prior agents regarding prior calls and prior issues or requirements, contact information such as names, addresses, and telephone numbers, lists of products owned by the customer, and the like.

In some exemplary embodiments, the contact center also includes an OOB application server 130 separate from the web server 120 configured to provide OOB or supplemental communications channels to the customer end-user devices 12. For example, in some embodiments the web server 120 is configured to handle and supply functionality related to WebRTC calls between the web browser 11 and the WebRTC/call server 110 while the OOB application server 130 is configured to provide code and/or media associated with the out-of-band communication channels. In other embodiments, the out-of-band communication channel functionality may be provided by the web server 120. These out-of-band communications channels may include, without limitation, channels that provide web browser-based forms, text chats, video, and other types of media that may typically be presentable by a web server to a customer via a web browser. For example, text-based chat may be used for increased accuracy when communicating addresses, email addresses, and credit card payment information, and to provide URLs to web pages to answer user questions. The OOB channels may also be used for video tutorials, official documentation, and screen sharing for demonstrating usage. OOB channels may also provide some redundancies in the case of poor connections in the real-time communication channel. In this regard, the WebRTC/call server 110 may assist in establishing socket connections between the customer end-user device 12 and the out-of-band application server 130 and/or the agent device 112.

According to one exemplary embodiment of the invention, an end user viewing a website provided by the web application 122 (referred to as the website visitor) may decide to speak to an agent for asking questions about products viewed on the website, engage in a particular transaction, or for receiving any other assistance from the agent. A conventional method for initiating this conversation is by dialing a telephone number (e.g., a toll-free or "1-800" number). The user may also request (e.g. via email) that the agent call the customer at a particular telephone number, or may engage in a text-based chat with the agent via the web browser 11. According to exemplary embodiments of the present invention, the end user may, in addition or in lieu of these conventional contact mechanisms, establish a WebRTC call with an agent via the web browser. Using WebRTC allows a user to participate in a real time voice conversation with an agent, thereby increasing their engagement, while reducing the costs associated with operating a contact center reliant on standard PSTN (public switched telephone network) telephone systems. In addition, WebRTC calls may be associated with particular browser sessions, thereby simplifying the task of associating OOB channels with the "in-band" audio/video channel.

The various servers 110, 114, 130, 150, 160, and web monitor of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2A:
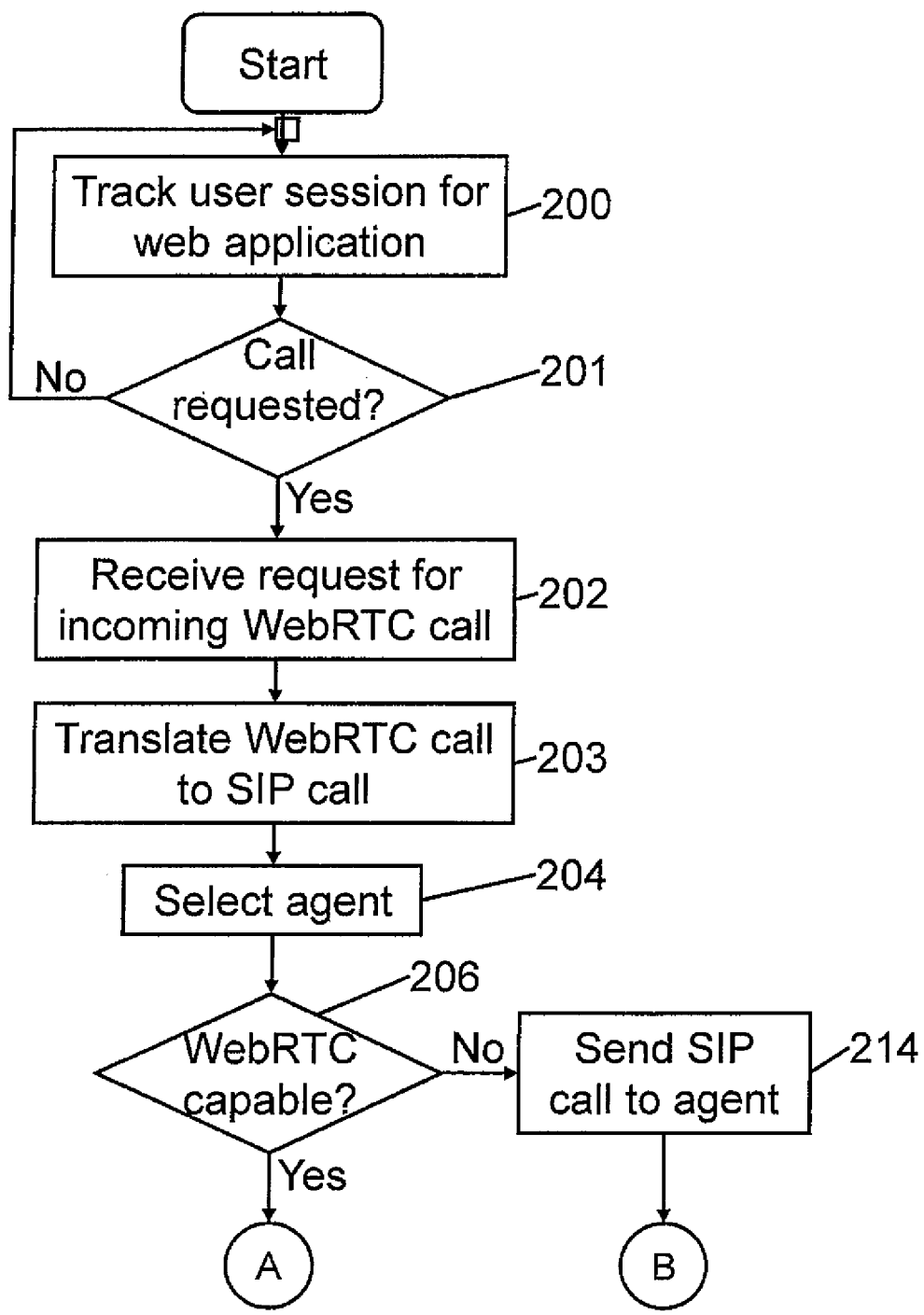
FIGS. 2A and 2B are flowcharts of a process for connecting a web application user to a contact center agent according to one exemplary embodiment of the present invention.
Figure 2B:
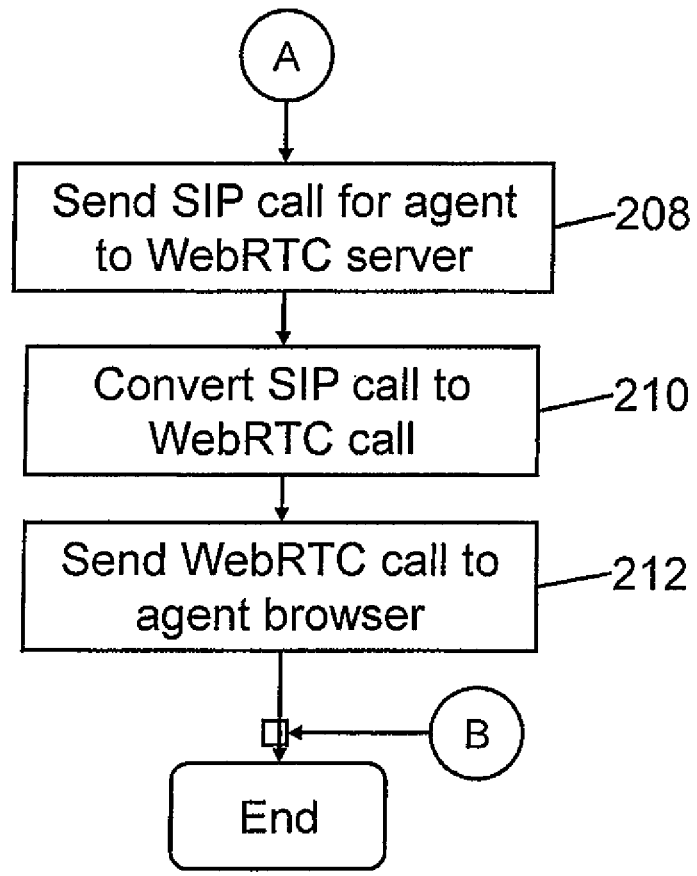

FIGS. 2A and 2B are flowcharts of a process for connecting a web application user to a contact center agent according to one exemplary embodiment of the present invention. The process may be described in terms of one or more software routines executed by one or more processors based on computer program instructions stored in memory. A person of skill in the art should recognize, however, that the process may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

The process starts, and in step 200, the web monitor 140 tracks a user's session on a web application, such as, for example, the web application 122 provided by the web server 120. In this regard, a user invokes the browser 11 in the end-user device 12 to access the web application 122. The user may interact with the website/application by navigating though the pages of the website, selecting different links, submitting information, initiating transactions, or performing other actions as will be apparent to a person of skill in the art. The navigating of the various pages and the actions performed while visiting the website is tracked by the web monitor 140 as discussed in further detail in the above-referenced U.S. application Ser. No. 13/293,575. For example, while using the web application 122, a session identifier (a "session ID" or "session token" or, alternatively, login information associated with a user account) may be granted and associated with the customer end-user device 12 and/or the web browser running thereon, thereby allowing the web application 122 and other servers operated by the organization and/or the contact center to identify the user and to track the user's activity.

According to one exemplary embodiment, the web monitor 140 monitors/tracks the user's activity on the web application 122 to determine the intent or goals of the user while using the website (e.g., determining which category of products or services the user is interested in purchasing or determining the problem that the user would like to resolve) and associate this computed result with the user's session identifier. According to one exemplary embodiment, the web monitor 140 supplies to the routing server 160 information regarding the monitored activity of the user as associated with a particular session identifier.

While perusing the information on the website, the user may decide to speak to a customer service representative to obtain information or to ask for assistance in regards to a product or service being viewed. According to one example, the visitor may transmit the command to initiate the call by selecting a "call" button. According to one exemplary embodiment, the web application interprets the command as a command to initiate a browser based real time communication channel (referred to as a WebRTC call).

In step 202, the WebRTC/call server 110 receives the request to initiate the WebRTC call with a customer service representative. According to one exemplary embodiment, the request to initiate the call includes, for example, a Session Description Protocol (SDP) offer (as described in Internet Engineering Task Force (IETF) Request for Comments (RFC) 3264), which may include an Interactive Connectivity Establishment (ICE) candidate (as described in IETF RFC5245). The offer may include information such as a session identifier for identifying the requested session, and an IP address of the requesting end-user device.

In step 203, the WebRTC/call server 110 translates the WebRTC call to a SIP call using a SIP protocol, and sends a request (e.g. via an INVITE message) to the SIP server 114. Although a SIP call is used as an example, a person of skill in the art should recognize that a different protocol for VoIP communication may be used instead of SIP, such as, for example, H.323.

In other embodiments of the present invention, the web server 120 may provide the JavaScript that drives WebRTC functionality to the web browser. When the user activates a WebRTC session, the other party is matched to the WebRTC/call server 110. The WebRTC/call server 110 acts as a proxy or gateway for connection to the actual (end-) party of the user's WebRTC session, where the actual party may be, for example, a WebRTC enabled agent or a SIP enabled agent.

In step 204, the routing server 160 is invoked by the SIP server 114 for identifying an appropriate agent to route the call.

In step 206, a determination is made by, for example, the SIP server 114 in combination with the router, as to whether the identified agent is associated with a WebRTC capable browser. If the answer is NO, the SIP server transmits, in step 214, a SIP call to the selected agent. For example, the SIP server 114 transmits a SIP INVITE message to the selected agent's SIP device (e.g. telephone 116). The selected agent thus communicates with the website visitor via his or her SIP device, while the website visitor communicates with the selected agent via the web browser 111. In some exemplary embodiments, this WebRTC call (referred to as an in-band connection) is used solely for voice (e.g., audio only). In other exemplary embodiments, the connection includes both audio and video. Referring again to step 206, if a determination is made that the selected agent has a WebRTC-capable browser, the SIP server 114 transmits a SIP call for the agent to the WebRTC/call server 110. In this regard, the SIP server 114 transmits a SIP INVITE message including an address of the selected agent.

In step 210, the WebRTC/call server 110 converts the SIP call to a WebRTC call. In this regard, the WebRTC/call server 110 acts as a bidirectional gateway between WebRTC and SIP based calls.

In step 212, the WebRTC/call server 110 sends the WebRTC call to the browser in the selected agent's device 112. Thus, both the agent and the website visitor engage in communication via their respective web browsers.

Figure 3:
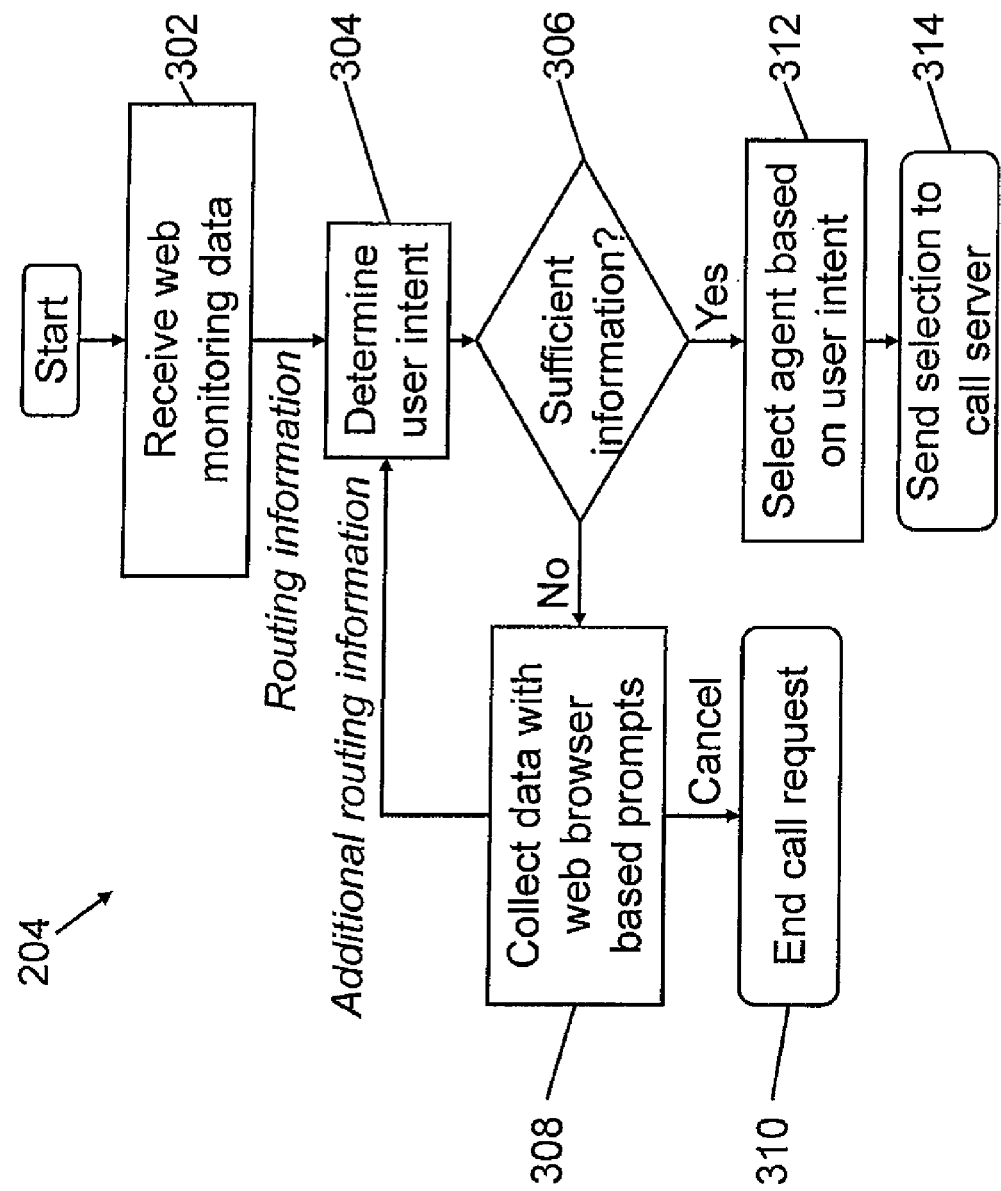
FIG. 3 is a flowchart of a process for identifying the appropriate agent for routing the call according to one exemplary embodiment of the present invention.

FIG. 3 is a more detailed flow diagram of step 204 of FIG. 2A for selecting an appropriate agent for routing an incoming call according to one exemplary embodiment of the invention. In step 302, the routing server 160 receives the routing information (e.g., the location of the user on the web app) from the web monitor 140 to assist in routing the call to an appropriate customer service representative. In step 304, the routing server 160 attempts to determine the user's intentions (e.g., purchasing a product, technical support, etc.). In step 306, the routing server 160 determines if the routing information is sufficient to determine the user's intent. If there is sufficient information, the routing server selects an appropriate agent in step 312, and information identifying the selected agent such as, for example, an agent identifier, telephone number, and/or IP address is sent in step 314 to the WebRTC/call server 110.

Referring again to step 306, if the routing server determines that the information received is insufficient for routing the call, additional routing information may be collected in step 308 from the website visitor. According to one exemplary embodiment, the routing server invokes the OOB application server 130 for obtaining the additional information. In one exemplary embodiment of the present invention, the OOB application server 130 displays one or more prompts (e.g., web forms or a series of prompts in a wizard) via an OOB channel to obtain the additional information. For example, a webpage may be displayed to the website visitor inquiring additional details on the call, such as, for example, the reason for the call, a particular language that is preferred, and the like.

According to one exemplary embodiment, the OOB application server 130 provides one or more OOB channels of communication within the browser in addition to (e.g., concurrently with) the real-time communication channel (e.g., the WebRTC connection).

According to one exemplary embodiment, the OOB application server 130 forwards the additional information to the routing server 160 or to the call server 114 to route the call to the appropriate customer service representative.

In embodiments of the present invention which include the web monitor 140, the one or more prompts for additional information may be selected based on the sufficiency of the information determined by the web monitor 140. For example, the web monitor 140 may determine that a user is interested in obtaining product support because the user has been browsing troubleshooting pages. However, in some circumstances the web monitor 140 may not have sufficient information to determine the particular product that the user is having issues with. As such, when the user makes a request to establish a real-time communication channel with a customer service representative, the out-of-band application server 130 may first prompt the user to indicate that it believes that the user is looking for customer support and may ask the user to identify a product from a list of products that the user would like help with.

According to one exemplary embodiment of the invention, the session identifier transmitted with the request for a WebRTC call is used to associate the website user with the particular session of the web application, the user's call request, and the user's responses to the web-browser based prompts.

The additional routing information may be combined with the previously collected routing information and reassessed in step 304 to determine if there is sufficient information to determine a user's intentions. The process may be repeated until sufficient information is received. The user may also choose to cancel the call request rather than to continue to answer questions via the web prompt, in which case the call request is ended in step 310.

Figure 4:
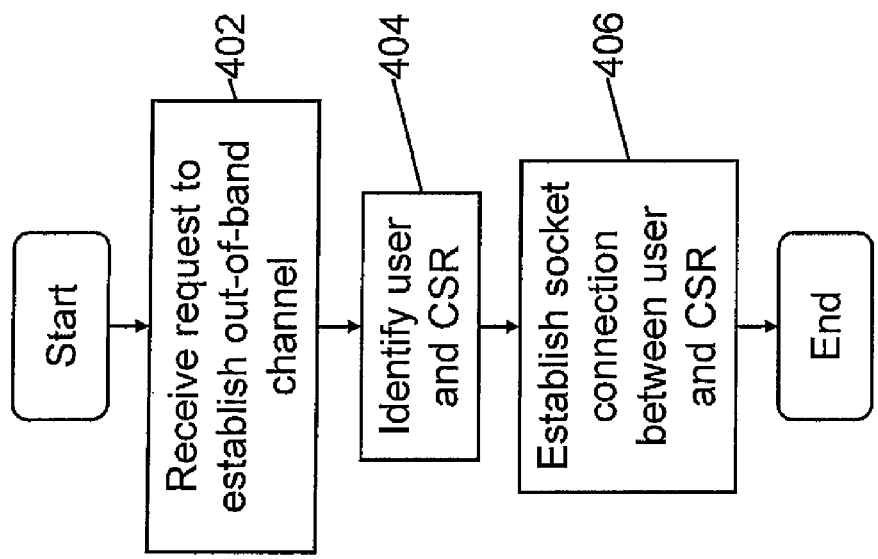
FIG. 4 is a flow diagram illustrating a process for establishing an out-of-band channel according to one exemplary embodiment of the present invention.

FIG. 4 is a flow diagram of a process for establishing an OOB channel connection between the customer end-user device 12 and the agent device 112 according to one exemplary embodiment of the invention. According to one exemplary embodiment, the one or more out-of-band channels may be associated with the session identifier associated with the corresponding browser-based real-time communication channel established as described, for example, with respect to FIGS. 2A and 2B. As discussed above, the out-of-band information may include, but is not limited to, text chats, screen sharing, shared documents, an inline frame ("iframe") for displaying web pages, and the like.

The out-of-band application server 130 receives request to establish an out-of-band channel in step 402. Either the user or the customer service representative (CSR) may make this request via their web browsers on their end-user devices and the out-of-band channel may be activated at the contact center. The request may identify one or more types of out-of-band channels (e.g., text chat, screen sharing, etc.) to be established. The out-of-band application server 130 also uses session identifiers to identify 404 the user and the CSR to be connected. The out-of-band application server 130 then establishes a connection (e.g., a WebSocket connection) between the user and the CSR using their respective session identifiers. This connection can be used to provide a channel for communicating the out-of-band information between the user and the CSR.

As described above, according to one exemplary embodiment of the present invention, the out-of-band channels and out-of-band information are used to supplement the "in-band" WebRTC-based voice and/or video communication channel, by providing additional communication channels such as text chat, screen sharing, and the like.

In some embodiments of the present invention, the party (e.g., the user or the CSR) not requesting the out-of-band channel may be prompted to confirm or reject the request to establish the out-of-band channel. In addition, in some embodiments of the present invention, separate connections (e.g., separate WebSocket connections) are established between the user and the CSR (e.g., the web browsers used by the user and the CSR) for each type of out-of-band channel, or some or all of these connections can be shared by the types of out-of-band channels used.

FIG. 5A is an exemplary screen shot of an exemplary browser window 100 displayed on the customer end-user device 12 where a customer using the customer end-user device 12 is shopping on the "ACME Products" website according to one exemplary embodiment of the present invention. After perusing the website, the user may want to speak to a customer service representative to obtain information or to ask for assistance in regard to a product or service being viewed by the user. According to one exemplary embodiment, the website provides a button 101 to initiate a request for a WebRTC call with the related contact center to speak with an agent. In other embodiments, the opportunity to establish a call may be indicated with a pop-up window, an overlay, or another object on the web page.

In the illustrated example, a request to establish a WebRTC call is transmitted by the browser 111 in response to the user's selection of the button 101. The established WebRTC call between the website visitor and an agent may be audio only, or audio and video. FIG. 3B is an exemplary screen shot of a browser window 100 with a pop-up window 102 displaying a real-time video call with an agent.

Figure 6A:
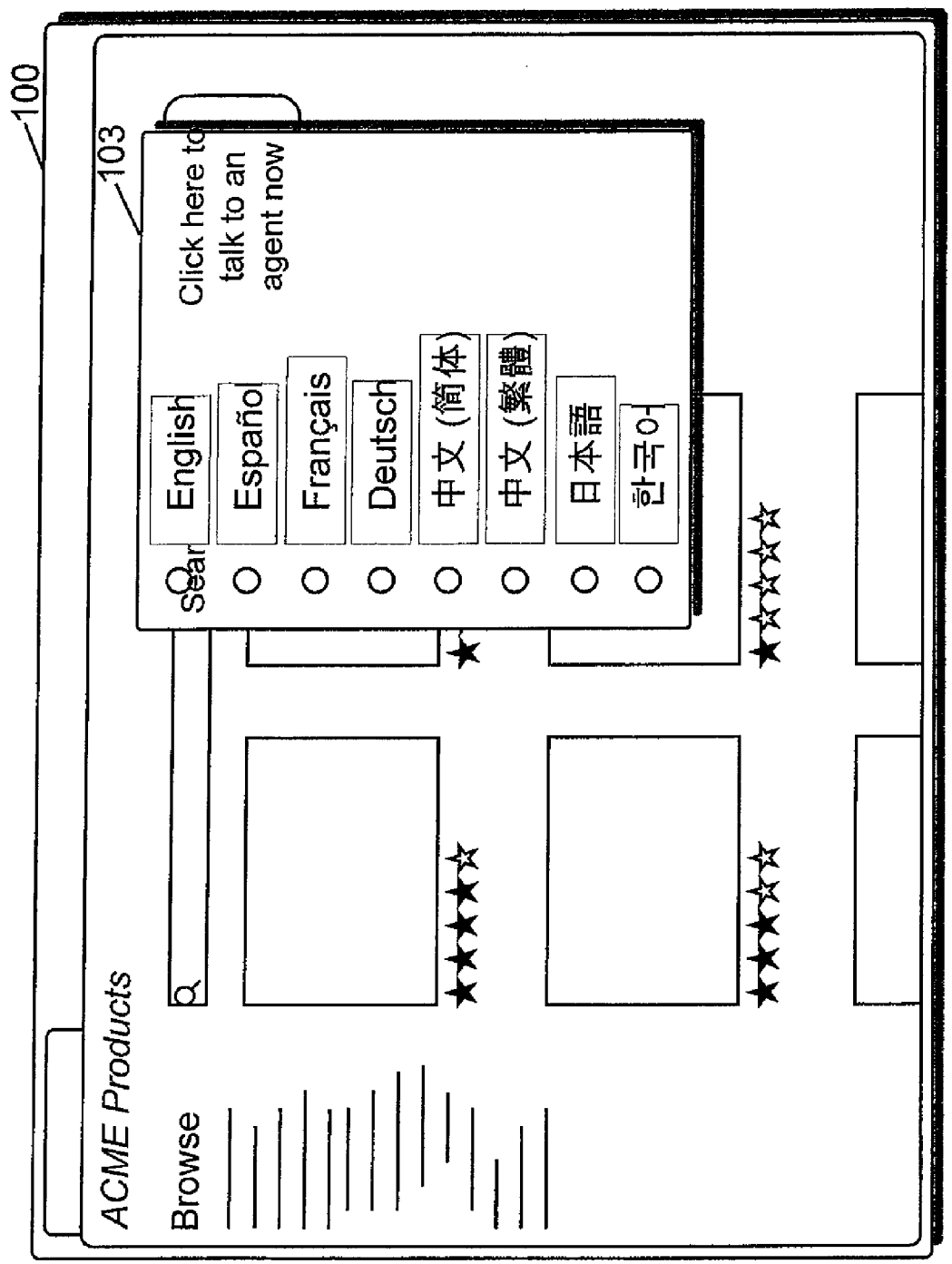
FIGS. 6A and 6B are schematic diagrams of browser windows with pop-up windows displaying requests for additional information from a customer, according to one exemplary embodiment of the present invention.
Figure 6B:
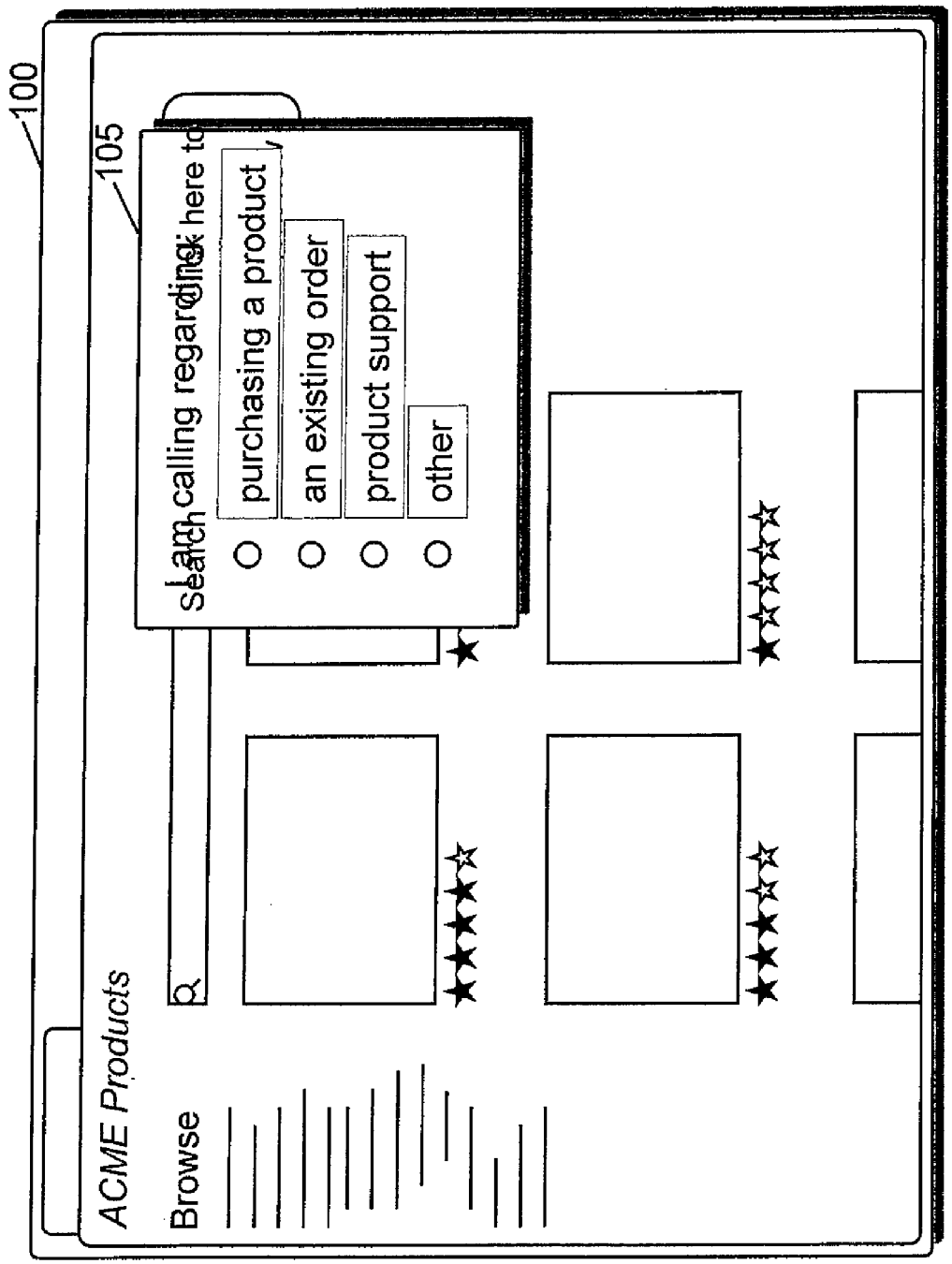

FIGS. 6A and 6B are exemplary screen shots of pop-up windows 103, 105 displayed for requesting additional information from the website visitor according to one exemplary embodiment of the invention. The pop-up windows may be used to prompt the user to select from a choice of languages, to indicate whether the call relates to sales, support, or other customer service, and/or to identify a category of products to which the call relates.

Figure 5B:
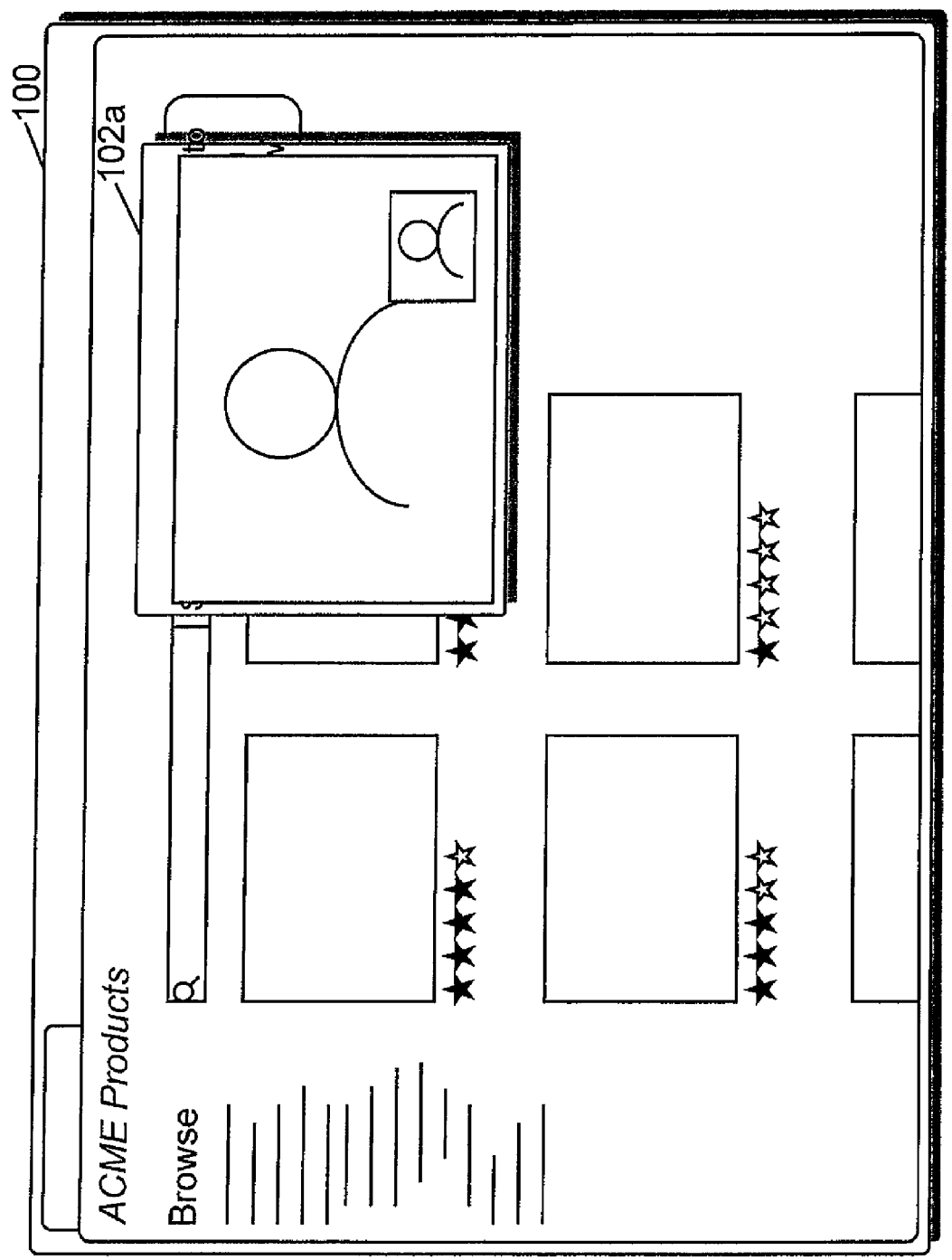
FIG. 5B is a schematic diagram of a browser window with a pop-up window displaying a real-time video call with an agent according to one exemplary embodiment of the present invention.
Figure 7:
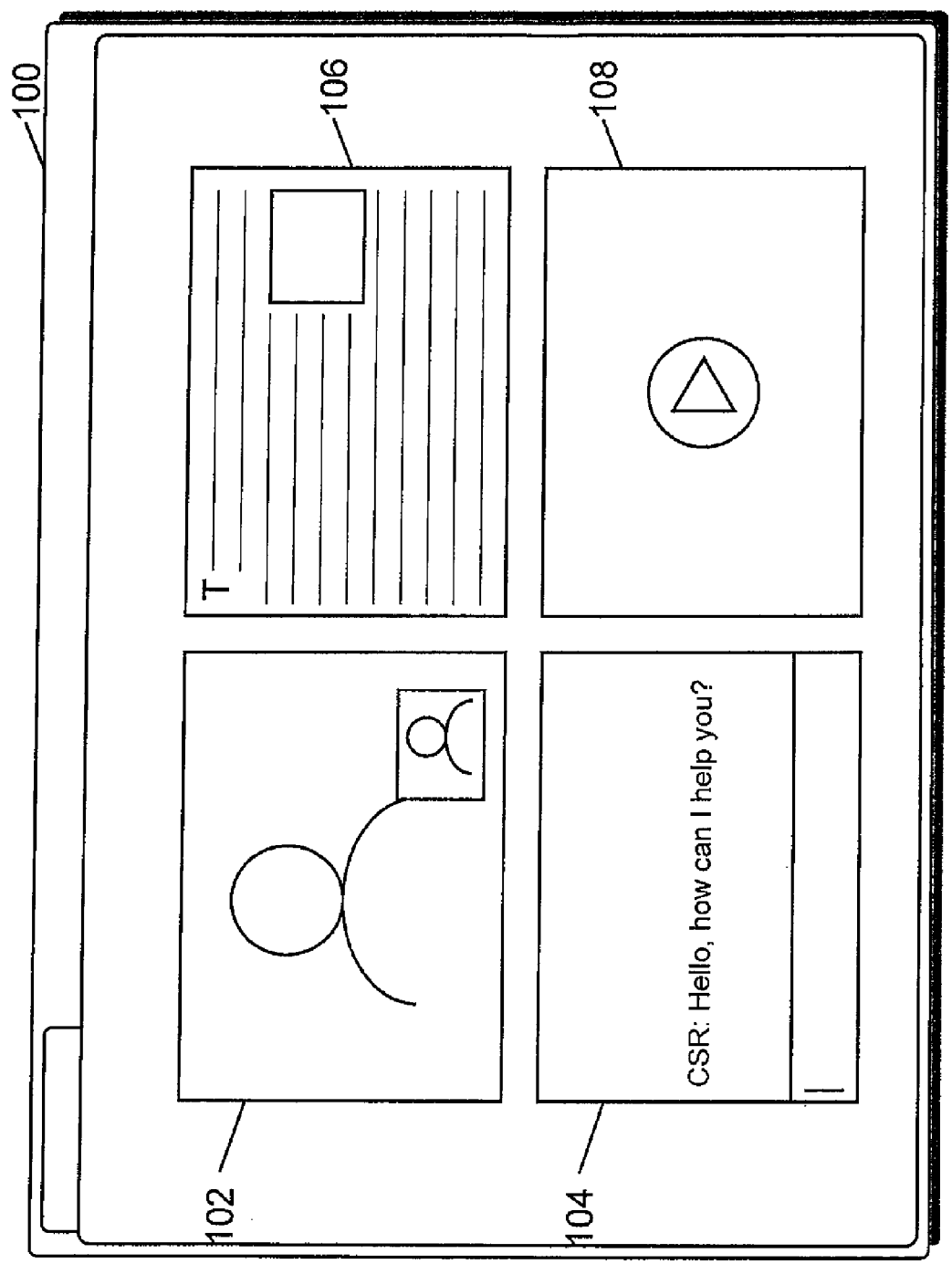
FIG. 7 is a schematic diagram of a browser window displayed by the end-user device of a customer engaged in a communication session with a customer service representative and with a plurality of out-of-band channels according to one exemplary embodiment of the present invention.

FIG. 7 is an exemplary screen shot of a browser window 100 displayed by the end-user device 12 of a customer engaged in a communication session with a customer service representative and with a plurality of out-of-band channels according to one exemplary embodiment of the present invention. In the example of FIG. 7, a user's browser window may include a plurality of sub-windows 102-108, where these sub-windows provide additional out-of-band information and communications channels including, without limitation, a video chat window 102, a text chat window 104, a document viewer window 106, and a video window 108. Embodiments of the present invention are not limited to the listed windows and may include other windows for displaying other types of content such as, for example, a digital "whiteboard" for drawing diagrams, displaying images, displaying billing information, and displaying a live view of a customer service representative's computer screen, or a portion thereof, for demonstrating the use of a product or service, or the like. In addition, as shown in the example of FIG. 5B, in some embodiments of the present invention, a sub-window 102a may float in a separate browser window.

WebRTC Communication with Optimized Transcoding

In general terms, when a browser wants to initiate a real-time channel with another browser, referred to as a peer connection, the browser acquires the necessary resources using Javascript and packages the signaling information to the other browser/peer. How the signaling information is transported over to the other browser or peer is a concern that is entirely up to the application. Typically a browser supports only HTTP and in some cases WebSocket, the signaling information needs to be transported over to the other peer using whatever mechanism defined by the web application.

Within the signaling, there is a negotiation process between the peer browsers to determine the transport and media attributes. As of this writing the media attributes are encapsulated in the form of the Session Description Protocol (SDP). Using a similar model as the SDP offer/answer model, the negotiation process is called Javascript Session Establishment Protocol (JSEP).

Once JSEP completes the media negotiation, the media is transported over Secure Real-time Transport Protocol (SRTP) between the peer connections. In order to allow interoperability among the existing VoIP equipment, a media gateway is configured to bridge signaling and media to a SIP phone.

In some situations where a WebRTC endpoint communicates with a legacy endpoint (e.g. a SIP endpoint), there may be no common codec between the two endpoints to encode and decode audio/video transported "over the wire." For example, a legacy SIP endpoint may only support a H.263/4 video codec while a WebRTC browser (e.g. Google Chrome) may only support a VP8 video codec. Even if the two endpoints did support the same codec, certain situations may arise where the codec may not be used by one of the endpoints. For example, even if the G.711 audio codec were supported by both endpoints, certain deployments with bandwidth requirements may mandate the use of low bitrate codecs (e.g. G.729 codec) instead of the higher bitrate G.711 codec. Low bitrate codecs may not be supported by, for example, the WebRTC browser.

In order to address the above-mentioned problems, embodiments of the present invention provide a transcoding service to bridge two endpoints and allow media to be exchanged between them even if they do not share a common media codec. According to one embodiment, transcoding is optimized so that unnecessary transcoding is avoided; instead, transcoding occurs if it is deemed to be a situation that requires the transcoding. According to one embodiment, transcoding is made transparent to the user.

Figure 8:
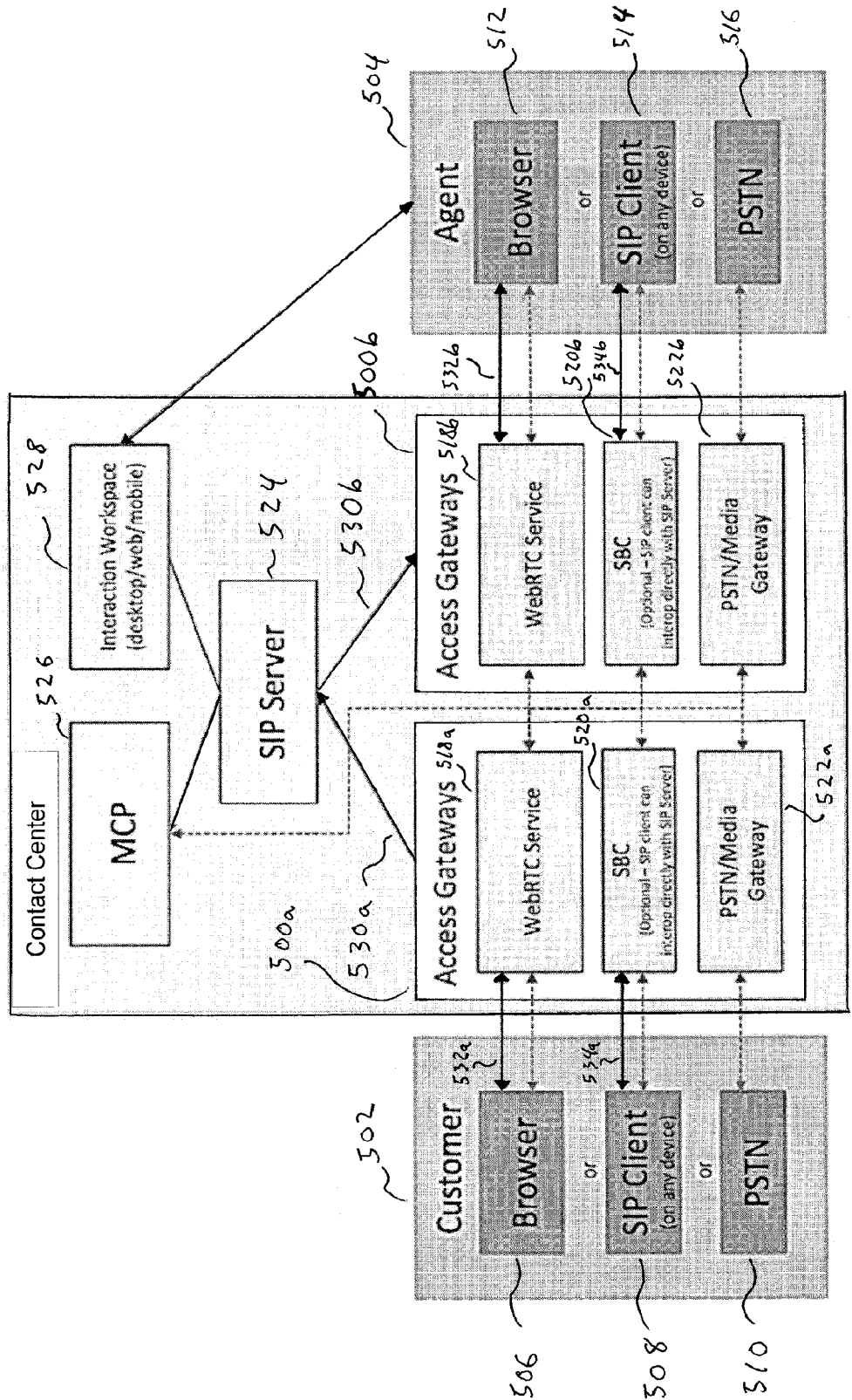
FIG. 8 is a block diagram of a system for WebRTC communication with optimized transcoding according to one embodiment of the invention.

FIG. 8 is a block diagram of a system for WebRTC communication with optimized transcoding according to one embodiment of the invention. The system of FIG. 8 may include one or more access gateways 500a, 500b (collectively referenced by reference number 500) configured to interact with customer and agent devices (also referred to as endpoints) 502, 504. The access gateway 500 may, according to one embodiment, be one or more processes or threads running on one or more processors, in one or more computing devices. According to one embodiment, the access gateway 500 is configured to bridge different types of real-time media sessions between the customer and agent devices.

The customer device 502 may be similar to the end-user device 12 of FIG. 1, and may take the form of a standard desktop or portable computer, tablet, smartphone, standard telephone or cellular phone, television, game console, and/or any other device with a processor, memory, and input/output units providing capability for real-time audio and/or video communication. For example, depending on the capabilities of the customer device, the device may engage in a WebRTC call via a web browser application 506, a VoIP call via a SIP client application 508, or a traditional telephone call via PSTN wires and connections 510.

The agent device 504 may be similar to the agent devices 112 and 116 of FIG. 1, and may take the form of a standard desktop or portable computer, tablet, smartphone, standard telephone or cellular phone, television, game console, and/or any other device with a processor, memory, and input/output units providing capability for real-time audio and/or video communication. As with the customer device, depending on the capabilities of the agent device, the agent device may engage in a WebRTC call via a web browser application 512, a VoIP call via a SIP client application 514, or a traditional telephone call via PSTN wires and connections 516. One or more of the agent devices may be used concurrently by an agent to engage in a real-time media communication with a customer. For example, an agent desktop 528 may be displayed on a desktop computer to provide data about the customer while the agent engages in a telephony call via a SIP phone.

The browser and SIP client applications 506, 508, 512, 514 may be implemented as software program instructions that are stored in memory or any other non-transitory storage medium, that, when executed by a corresponding processor, cause the processor to provide the WebRTC or VoIP telephony call functionality that will be understood by a person of skill in the art.

According to one embodiment, the access gateway 500 is configured to allow customer devices and agent devices to communicate using different types of real-time communication protocols and codecs. In this regard, the access gateway includes one or more of a WebRTC service gateway 518a, 518b (collectively 518), VoIP gateway 520a, 520b (collectively 520), and PSTN/media gateway 522a, 522b (collectively 522). The PSTN/media gateway 522 allows customers and agents to engage in a PSTN call. The VoIP gateway 520 allows customers and agents to engage in a VoIP call via SIP signaling over SIP legs/call paths 534a, 534b. The WebRTC service gateway 518 allows customers and agents to engage in a WebRTC-to-WebRTC call (also referred to as a browser-to-browser call) via any application message built on top of a web signaling protocol, such as, for example, the hypertext transfer protocol (HTTP). Such an application message may adhere, for example, to a ROAP (Rtcweb Offer/Answer Protocol). Of course, the invention is not limited to ROAP, and any other protocol may be used in lieu or in addition to ROAP.

According to one embodiment, a browser-based call established via web signaling over legs 532a, 532b ensues if both the customer and agent devices include the WebRTC enabled browsers 506, 512. If either the customer or the agent does not support WebRTC, the WebRTC service gateway allows one of the parties to conduct a WebRTC call/session while the other party conducts a SIP call/session. The access gateway 500 acts as a common endpoint for both the WebRTC session and the SIP session. In this regard, a WebRTC call/session is established between a web browser and the access gateway, while a SIP call/session is established between the access gateway and a SIP client.

The WebRTC service gateway 518 may be similar to the WebRTC/call server 110 of FIG. 1. In this regard, the WebRTC service gateway 518 is configured to establish WebRTC sessions and act as a gateway between WebRTC and SIP. In this regard, the WebRTC service gateway 518 is coupled to a SIP server 524 which may be similar to the SIP server 114 of FIG. 1. Although SIP is used as an example, a person of skill in the art should recognize that any other VoIP protocol may be used in addition or in lieu of SIP.

According to one embodiment, the WebRTC service gateway is configured to convert a WebRTC call into a SIP call and communicate with the SIP server 525 over SIP legs 530a, 530b using SIP signaling messages. In this manner, a WebRTC call may be processed and routed similarly to a SIP call. The SIP server 524 has access to various contact center system components such as, for example, a routing server, which may be similar to the routing server 160 of FIG. 1, in order to provide the routing and other functionalities typical for a contact center.

According to one embodiment, the SIP server 524 is also coupled to a media controller 526 configured to provide media services to the customer and/or agent devices 502, 504. Such media services may include, for example, music media servicers where music is played for the customer (or agent) while the call is being routed to a contact center resource.

According to one embodiment, the WebRTC service gateway 518 bridges the media exchanged during a browser-to-browser and browser-to-SIP calls. In doing so, the gateway 518 is configured to automatically transcode between different media codecs if the gateway detects that there is no common codec that is shared by both parties. In this regard, the WebRTC service gateway 518 includes a media stack configured for transcoding of different media on the wire. As a person of skill in the art should recognize, the media stack is a protocol stack that handles the actual transport of media between two endpoints. Real-time Transport Protocol (RTP) may be used as the base transport for delivering the real-time media.

According to one embodiment, the WebRTC service gateway 518 stores in memory a list of supported codecs for WebRTC and a list of supported codecs for SIP. Exemplary audio codecs include but are not limited to G.711, Opus, G.729, and the like. Exemplary video codecs include but are not limited to VP8, H.264, H.263, and the like. According to one embodiment, transcoding between the codecs is optimized/minimized when possible since the transcoding step may introduce delays in the real-time media exchange. In one example, the WebRTC service gateway gives preference to codecs provided by a session offerer/initiator so that to the extent that an answering device supports the codec, this codec is used for the media exchange, avoiding unnecessary transcoding.

In another example, a codec may be selected based on predictions on different parties that may be invoked during the call. For example, analysis of prior interactions with a calling customer may reflect that a specific type of agent is often patched into the call. For example, a non-English speaking customer may often require a translator to join the call, or a troublesome customer may always require a supervisor to join the call. According to one embodiment, consideration or prediction of different parties that may be invoked during a call, and the codecs supported by the predicted parties, may influence the selection of a current codec. According to one embodiment, a codec that is common to a majority of the predicted parties is selected and prioritized by the WebRTC service gateway 518.

Figure 9A:
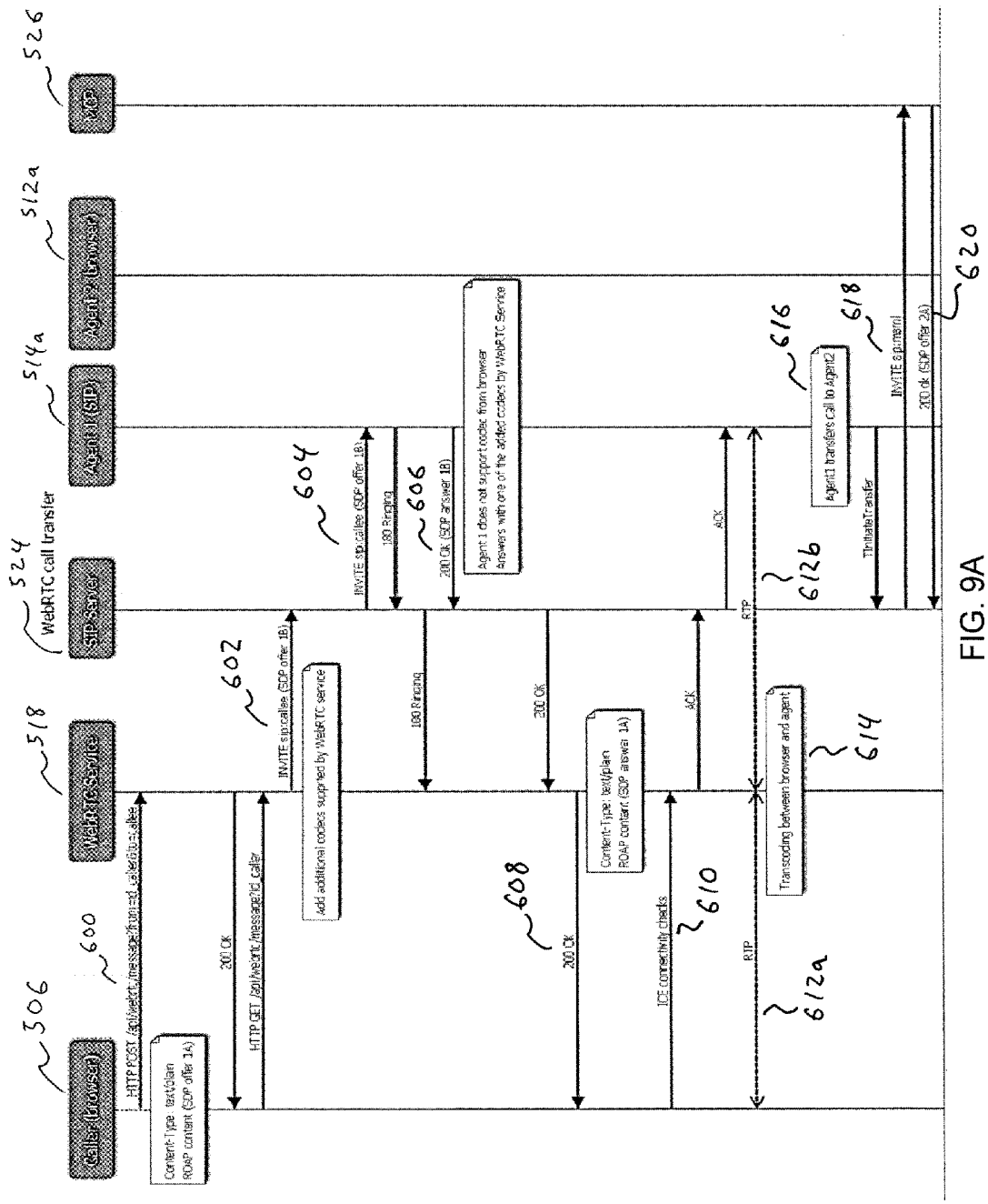

FIGS. 9A-9B are diagrams of signaling messages exchanged during the handling of a WebRTC call into the contact center according to one embodiment of the invention. In act 600, the customer's browser application 506 requests for a WebRTC call via a web signaling protocol such as, for example, the HTTP/ROAP signaling protocol. Included in the request is an SDP offer for negotiating media attributes and transports for the media channel to be established between the caller and callee. Included in the SDP offer as attributes is a list of audio and video codecs supported by the browser 506. For example, the SDP offer may include the following information on codecs: Audio: G.711, Opus, ISAC; Video: VP8.

The WebRTC service 518 processes the request and proceeds to establish a WebRTC session/call with the web browser application 506. In doing this, the WebRTC service determines whether codecs should be added or removed/replaced from the SDP offer. In this regard, the service 518 retrieves the list of codecs it supports and modifies the SDP offer as needed to match the list of supported codecs. In one example, the WebRTC service removes the ISAC audio codec and adds a G.729 audio codec and H.264 and H.263 video codecs. The modified SDP offer thus may indicate: Audio: G.711, Opus, G.729; Video VP8, H.264, H.263.

According to one embodiment, the codecs in the modified SDP offer are listed in an order of priority/preference, with the most preferred codecs being listed first, for selection in an SDP answer. According to one embodiment, preference is given to the codecs provided by the requesting web browser which are also supported by the WebRTC service. In this regard, in order to ensure selection of the codecs supported by the requesting web browser 506, the codecs from the requesting web browser are listed first, and any new codecs that are added by the WebRTC service 518 are added to the end of the list.

In act 602, the WebRTC server 518 transmits to the SIP server 524 a SIP invite message along with a new SDP offer containing the modified SDP offer data.

In response to the SIP invite message, the SIP server 524 engages in traditional processing and routing processing for identifying a resource to which to route the call. In this regard, the SIP server may invoke a routing server which executes the appropriate routing logic for identifying the appropriate resource. According to one embodiment, the routing logic may take into account the capabilities of an agent in selecting the agent to which to route the call. For example, if the SDP offer was for both audio and video, an agent having access to a device capable for both audio and video may be selected. The capability information may be specified even to the codec level. In this regard, the SIP and/or routing server may have access to the various codecs supported by the various agent devices 504. Assuming that there are two agents with the same skill set and capacity that may handle the call, the agent having a device that shares the same codec as that of the SDP offer may be selected for handling the call. In this manner, unnecessary transcoding between different codecs may be avoided.

In the embodiment illustrated in FIGS. 9A-9B, a first agent that is configured only for SIP calls is selected for handling the call. Accordingly, in act 604, the SIP server transmits a SIP message to the selected first agent for establishing a SIP session with the first agent, and the message is then processed by the agent's SIP client application 514a. The SIP message includes the SDP offer received from the WebRTC service 518.

In act 606, the first agent's SIP client application 514a returns an SDP answer with one or more codecs supported by the first agent's device. In the illustrated example, the first agent does not support any of the codecs from the browser, and answers with a codec added by the WebRTC service 518.

The WebRTC service 518 processes the SDP answer from the SIP server and recognizes that there is no common codec between the calling browser application 506 and the selected first agent device. Nonetheless, given the transcoding capabilities of the WebRTC service, the service allows the media session between the web browser 506 and the SIP client 514a. Accordingly, the WebRTC service 518 responds in act 608 with an SDP answer that agrees to the SDP offer provided by the web browser 506.

In act 610, the web browser 506 and WebRTC service 518 engage in ICE (Interactive Connectivity Establishment) connectivity checks for resolving the network path to the web browser 506 as will be understood by a person of skill in the art. The ICE protocol, which is defined in RFC 5245, addresses the problem of handling network address traversal (NAT) due to the web browser 506 with a private IP address utilizing the UDP protocol to send a real-time media stream during a WebRTC call. ICE uses Session Traversal Utilities for NAT (STUN) protocol as a mechanism for discovering the server reflexive address seen by a public server. Once a browser discovers all the addresses seen by public servers, the browser uses ICE to negotiate the connection with the peer.

According to one embodiment, the WebRTC service application 518 remembers the negotiated media attributes, resolved network path information, and other information about a current media session with the web browser 506 to avoid re-negotiating the media session (and avoid modifying the peer connection at the web browser side) in the event that there is a transfer or addition of another agent or contact center resource to the call. This helps avoid the time and extra processing that is expended in doing the re-negotiating, which includes the ICE connectivity check. In this regard, the WebRTC service 518 behaves like a peer endpoint with which the browser conducts the session negotiation (regardless of the agents or number of transfers to other agents that may occur during the session) and with which a peer connection is established based on negotiated media parameters. According to one embodiment, although re-negotiation is avoided if possible, it may not be avoidable, for example, if a new media stream is added to the call (e.g. call is upgraded from audio to audio and video).

In acts 612a and 612b, the web browser 506 transmits and receives media encoded by a first type of codec negotiated with the web browser, while the first agent receives and transmits media encoded by a second type of codec negotiated with the agent's SIP client application 514a. When the codecs are incompatible, the WebRTC service is configured to transcode between the first and second types of codecs in act 614. That is, the WebRTC service receives media encoded in the first type of codec and re-encodes the media, according to conventional transcoding algorithms stored in memory, according to a second type of codec, and vice versa.

In the example of FIGS. 9A-9B, the call is transferred to a second agent configured with a WebRTC enabled browser 512a, as is depicted via act 616. While the call is transferred, a media service, such as, for example, music/video-on-hold is requested by the SIP server 524 to the media controller 526 via act 618.

In response to the request, the media controller 526 transmits, in act 620, an SDP offer including the media codecs supported by the media controller. The media controller may or may not support the same codecs as the web browser 506.

Negotiation of the media codec ensues with the WebRTC service 518 as an endpoint as depicted via acts 622-626. Specifically in step 624, the WebRTC service 518 generates an SDP answer for the media controller 526 based on information already obtained about the web browser 506 during the initial session negotiation with the web browser. That is, according to embodiments of the present invention, there is no need to re-negotiate the session with the caller web browser unless, for example, new media channels are being added. The peer connection parameters negotiated for the call with the first agent, therefore, is maintained at the web browser side.

According to one embodiment, if the SDP offer from the media controller includes a media codec supported by the web browser, that media codec is selected by the WebRTC service 518 and included in the SDP answer back to the media controller. In this manner, unnecessary transcoding is avoided for the media provided by the media controller 526 to the web browser.

If the web browser does not support the native media codec used by the media controller in streaming its media, the media controller is configured to transcode the media to the codec supported by the web browser prior to transmitting the media to the web browser. Thus, according to this embodiment, transcoding by the WebRTC service 518 is disabled when the media controller 526 is invoked to transmit media during the call.

According to one embodiment, a transcoded media is stored in a cache of the media controller 526 for use for communicating with other incompatible browsers. Such caching is beneficial since the type of media that is provided by the media controller (e.g. music on hold) is not likely to vary much. When such caching functionality is enabled, the media controller is configured to check the cache first for media already transcoded to a particular codec, prior to engaging in the transcoding process.

In act 628, music and/or video provided by the media controller 526 is bridged through the WebRTC service 518 and transmitted to the web browser 506.

In act 630, the SIP server 524 transmits a SIP request to the second agent's web browser 512a to effectuate the transfer of the call to the second agent.

In act 632, the second agent's web browser 512a transmits an SDP offer with information on the codecs supported by this web browser.

In act 634, the WebRTC service 518 engages in negotiation of the SDP by identifying and selecting a codec that minimizes transcoding. For example, the WebRTC service selects the codec that may be common to the caller's web browser 506 and the agent web browser 512a. If multiple parties are involved, the WebRTC service may select a codec that is common to a majority of the parties involved. Again, no re-negotiation of the media session is performed with the caller's web browser 506 (unless a new media stream is added) since the WebRTC service 518 is aware of the codecs and other session parameters relevant to the call from the initial session negotiation. The peer connection parameters at the caller's web browser, therefore, does not change.

In act 636, real-time media exchanged between web browsers 506 and 512a is bridged through the WebRTC service 518.

Embodiments of the present invention allow media streams to be added or removed from a WebRTC session. The adding of a media stream may occur, for example, when an agent wishes to upgrade the call from an audio-only session, to an audio and video session where video is exchanged in addition to audio. According to existing browser privacy requirements, explicit consent must be given by the customer for the web browser application to access the customer's webcam or microphone. Assuming a majority of calls handled by a contact center are conducted using audio only, requesting that a user provide access to both the customer webcam in addition to his or her microphone may be unnecessary, and may result in undue discomfort by the customer to engage in web browser based calls with a contact center agent. Thus, according to an embodiment of the present invention, the customer initially only grants microphone access to the web browser 506 for an audio-only call. If the agent wishes to upgrade to video, he or she may do so by adding a video stream to the call. According to one embodiment, a new SDP offer/answer is conducted to provide the agent's video stream to the customer. As soon as the new SDP offer/answer is completed, the customer may see the agent's video stream. At this point, the Javascript library may provide the web application an option to ask whether the customer would like to grant access to the webcam during the call. If the user grants access to the webcam, a separate SDP offer/answer is conducted include the customer's video.

Figure 10:
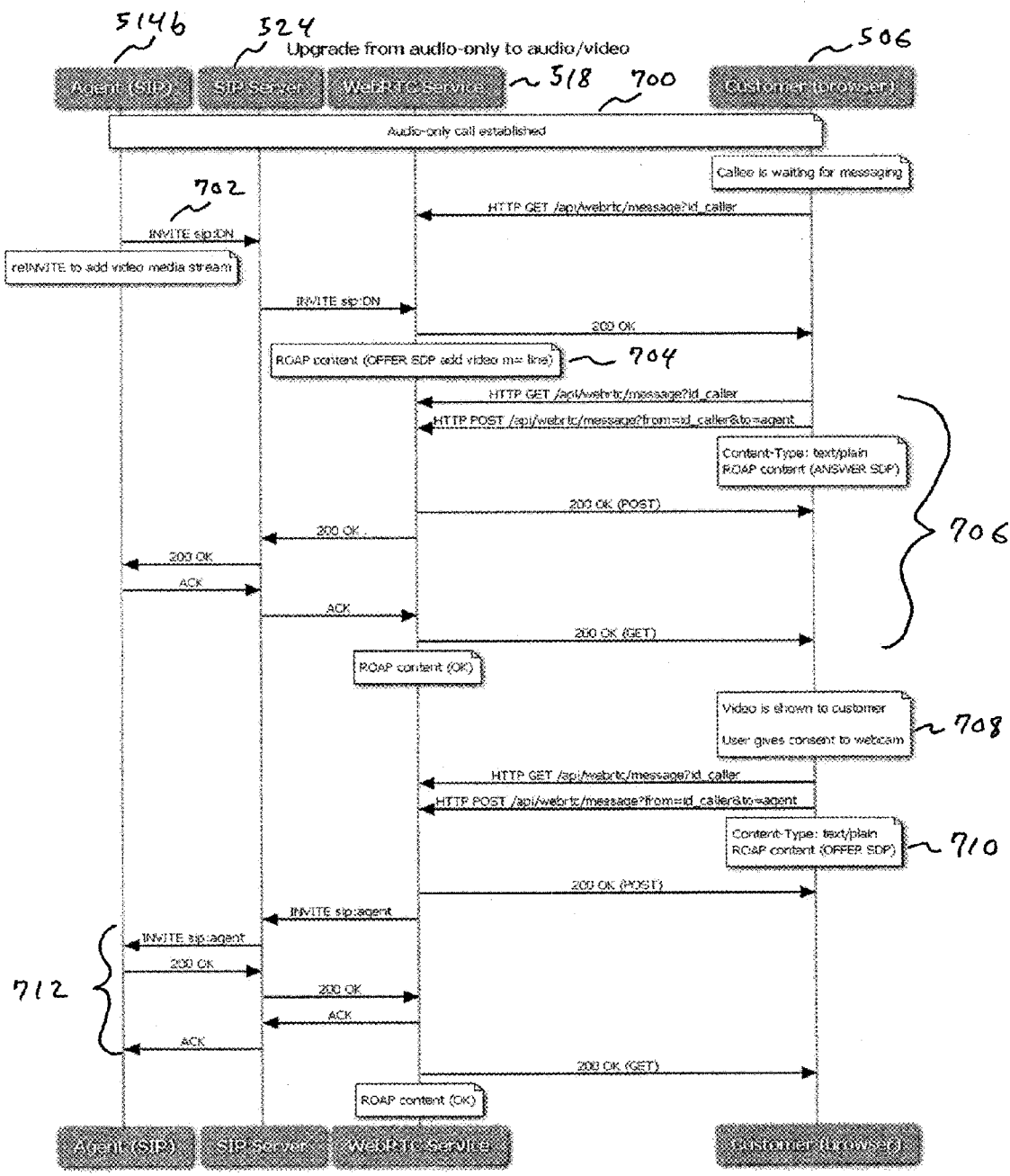
FIG. 10 is a diagram of signaling messages exchanged for upgrading an audio-only call into an audio and video call according to one embodiment of the invention.

FIG. 10 is a diagram of signaling messages exchanged for upgrading an audio-only call into an audio and video call according to one embodiment of the invention. In this messaging diagram, an assumption is made that an audio-only call is already established in act 700 between an agent's SIP client 514b and the customer's web browser 506. Of course, in other embodiments, the call may be a browser-to-browser call if the agent has access to the WebRTC enabled browser 512.

In act 702, the agent generates a new INVITE SIP message directed to the customer to add a video media stream. The WebRTC server 518 receives the SIP message and generates a ROAP message with an SDP offer for video in act 704. Video codecs supported by the WebRTC server is transmitted in the SDP offer.

Via signaling messages depicted generally via reference number 706, the video codec is negotiated between the WebRTC service 518 and the customer's web browser application 506. According to one embodiment, the video codec that is selected is aimed in minimizing transcoding as discussed above.

When the video attributes have been negotiated, the agent's video stream is displayed by the customer's web browser in act 708. According to one embodiment, although the agent's video stream is displayed, access to the customer's video is not given until the customer grants consent for the web browser application to access the customer's camera/webcam and start delivering the video captured by the customer's webcam. In this regard, the web browser application 506 displays a prompt for receiving the customer's consent to access the webcam during the call. In response to the customer indicating, via user input, grant of the access to the webcam, access is provided to the customer's camera via, for example, a "getUsermedia" Javacript function.

The consent by the customer results in a separate negotiation of the video attributes between the customer's web browser application 506 and the WebRTC service 518 to include the customer's video. In this regard, the web browser application 506 generates a separate SDP offer in act 710. The SDP offer is transmitted to the WebRTC service 518 which in turn generates and exchanges appropriate SIP messages with the agent's SIP client 514b (as indicated generally via reference number 712), to transmit a video stream captured by the webcam to the agent device for display thereon.

Each of the various servers, controllers, switches, and/or gateways in the afore-described figures may be a process or thread, running on one or more processors, in one or more computing devices 1500 (e.g., FIG. 11A, FIG. 11B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

Figure 11A:
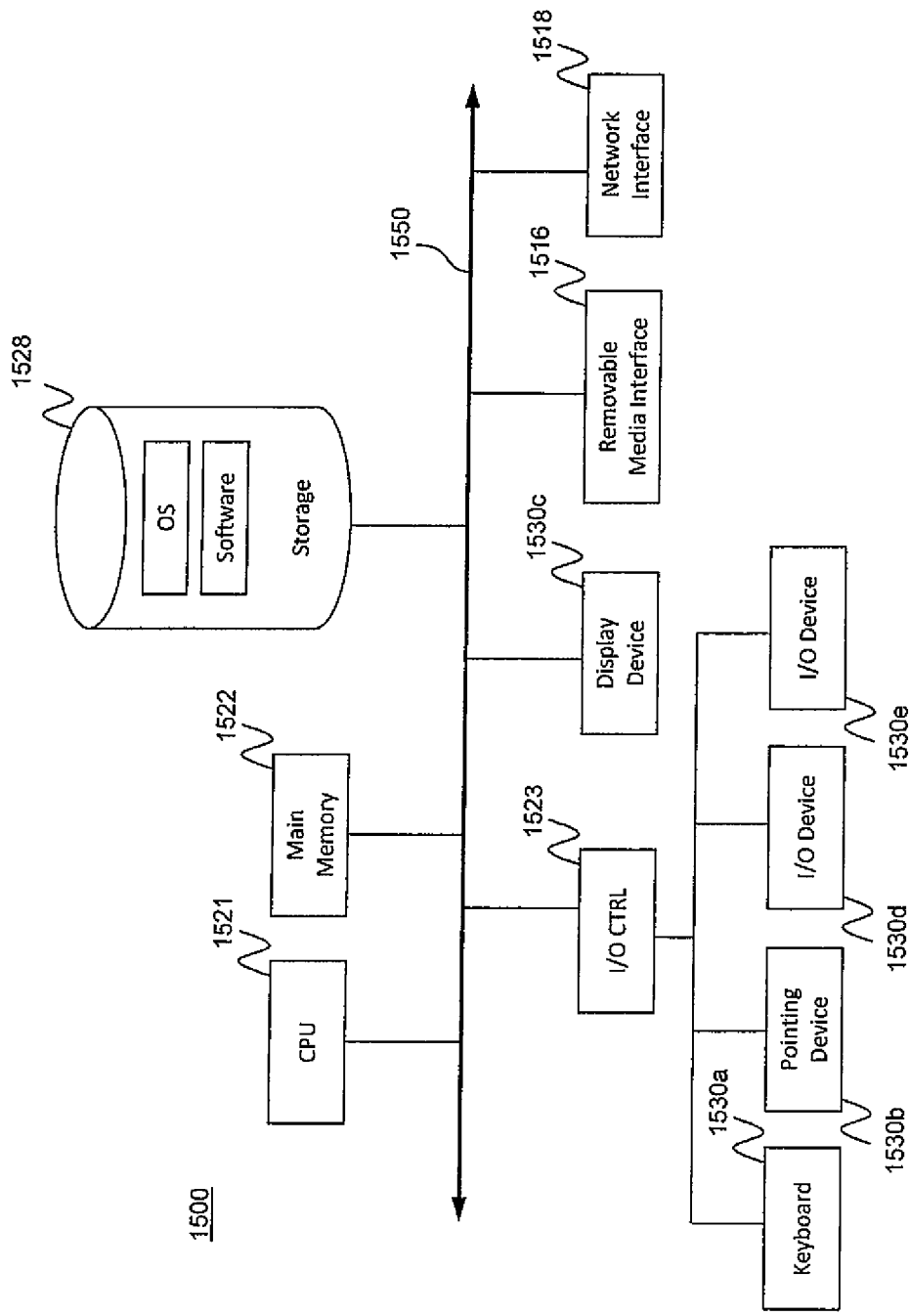
FIG. 11A is a block diagram of a computing device according to an embodiment of the present invention.
Figure 11B:
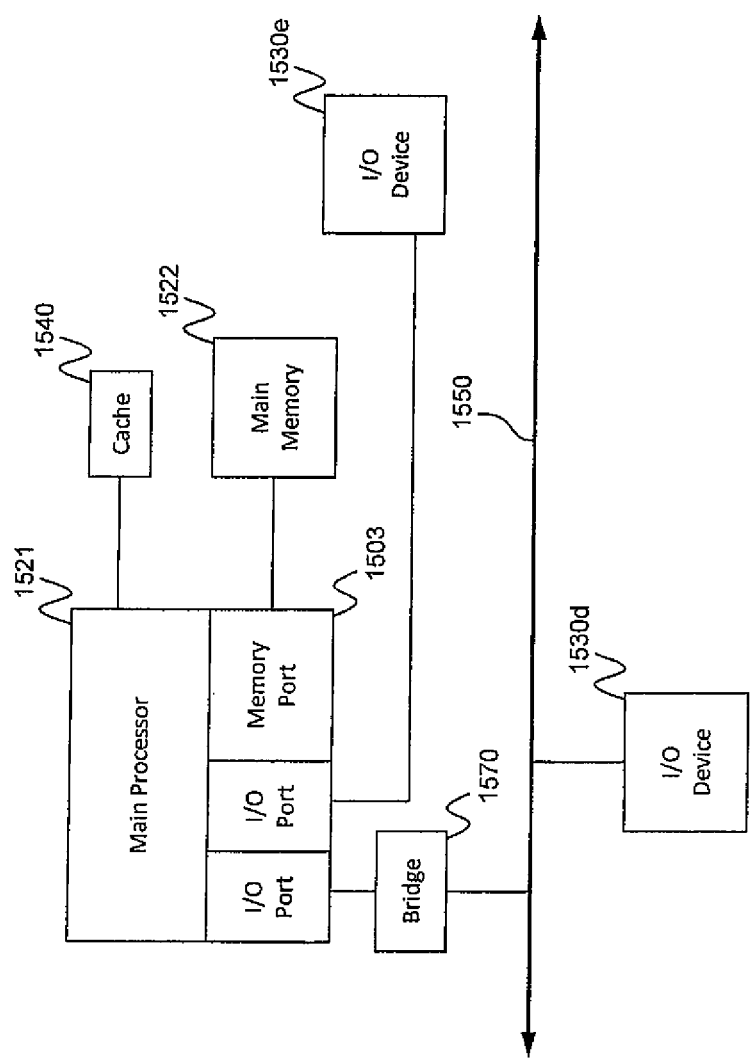
FIG. 11B is a block diagram of a computing device according to an embodiment of the present invention.

FIG. 11A and FIG. 11B depict block diagrams of a computing device 1500 as may be employed in exemplary embodiments of the present invention. Each computing device 1500 includes a central processing unit 1521 and a main memory unit 1522. As shown in FIG. 11A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 11B, each computing device 1500 may also include additional optional elements, such as a memory port 1503, a bridge 1570, one or more additional input/output devices 1530*d*, 1530*e* and a cache memory 1540 in communication with the central processing unit 1521. The input/output devices 1530*a*, 1530*b*, 1530*d*, and 1530*e* may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 11A, the central processing unit 1521 communicates with the main memory 1522 via a system bus 1550. As shown in FIG. 11B, the central processing unit 1521 may also communicate directly with the main memory 1522 via a memory port 1503.

FIG. 11B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 11A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530*c*, the central processing unit 1521 may communicate with the display device 1530*c* through an Advanced Graphics Port (AGP). FIG. 11B depicts an embodiment of a computer 1500 in which the central processing unit 1521 communicates directly with I/O device 1530*e*. FIG. 11B also depicts an embodiment in which local busses and direct communication are mixed: the central processing unit 1521 communicates with I/O device 1530*d* using a local system bus 1550 while communicating with I/O device 1530*e* directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 11A, may control the I/O devices. The I/O controller may control one or more I/O devices such as a keyboard 1530*a* and a pointing device 1530*b*, e.g., a mouse or optical pen.

Referring again to FIG. 11A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 11A and FIG. 11B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

As shown in FIG. 11C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 11D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 11E:
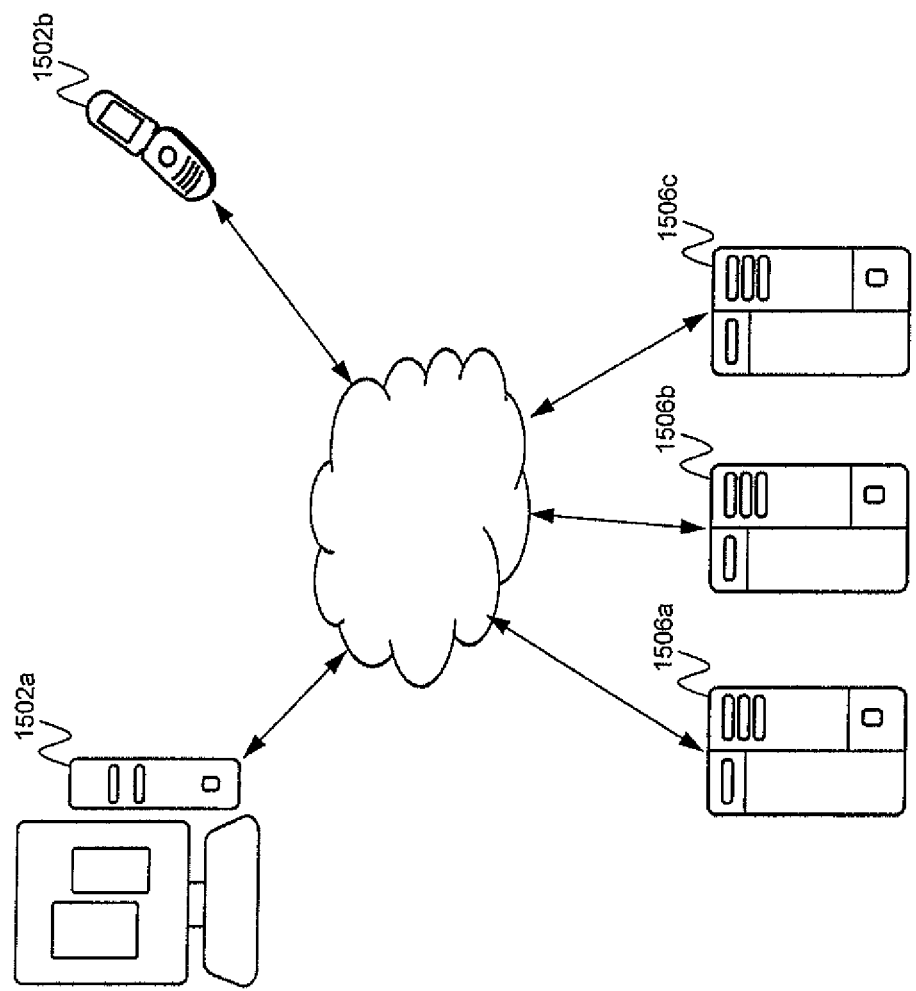
FIG. 11E is a block diagram of a network environment including several computing devices according to an embodiment of the present invention.

A computing device may be one of a plurality of machines connected by a network, or it may comprise a plurality of machines so connected. FIG. 11E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 11E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. For example, in some embodiments of the present invention may provide multi-party calls involving, for example, multiple agents interacting with a customer over WebRTC and the OOB communication channels, call transfer between agents, supervisor silent monitoring or whisper coaching (e.g., supervisor speaking to the agent without the customers being able to listen in) are also available and end users or customers may be able to conference in other parties via WebRTC.

While embodiments of the present invention illustrate a call server and routing calls via the call server, in some embodiments of the present invention, customer service representatives communicate with users directly via WebRTC connections without an intervening call server. In other embodiments a SIP server is included in the loop for purposes of call control, such as transfer, conferencing, or supervisors silent monitoring and whisper coaching.

In addition, while embodiments of the present invention have been described above in the context of WebRTC, other embodiments of the present invention may use other web-browser based conferencing technologies such as CU-RTC-WEB that similarly do not depend on the installation of additional plugins such as Adobe® Flash® or the Google® Talk plugin.

What is claimed is:

1. A method for real-time communication between a customer and a contact center resource, the method comprising:
   receiving by a processor a first offer for a browser-based call from a web browser application, the first offer including a first media codec supported by the web browser application;
   modifying by the processor the first offer and generating a second offer having a second media codec supported by the processor;
   in response to the second offer, the contact center resource generating an answer including a selection of the second media codec in the second offer; and
   bridging by the processor media exchanged between the web browser application and the contact center resource during the real-time communication, wherein in bridging the media, the processor transcodes the media based on the first media codec for media directed to and from the web browser application, and further transcodes the media based on the second media codec for media directed to and from the contact center resource.

2. The method of claim 1 wherein the contact center resource is a contact center agent device.

3. The method of claim 2, wherein the contact center agent device supports an agent web browser application for engaging in a browser-based call with the web browser application requesting the browser-based call.

4. The method of claim 2, wherein the contact center agent device includes a voice-over-IP client for engaging in a voice-over-IP call with the web browser application requesting the browser-based call.

5. The method of claim 4, wherein the processor establishes a web browser call leg with the web browser application according to a web signaling protocol, and establishes a voice-over-IP call leg with the contact center agent device according to a voice-over-IP signaling protocol.

6. The method of claim 1, wherein in generating the second offer, the processor is configured to list the media codecs in the second offer in an order of preference for selection by the contact center resource according to the listed order of preference.

7. The method of claim 1, wherein the processor deletes the first media codec in generating the second offer if the first media codec is not supported by the processor.

8. The method of claim 1, further comprising transferring the real-time communication to a second contact center resource for exchanging real-time media between the web browser application and the second contact center resource, wherein the transfer is without changing a peer connection.

9. The method of claim 8 further comprising:
negotiating by the processor a media codec for use for the real-time communication between the processor and the second contact center resource.

10. The method of claim 9, wherein the negotiating includes:
receiving by the processor an offer from the second contact center resource including a third media codec supported by the second contact center resource; and
transmitting by the processor an answer including a media codec selected based on knowledge of media codecs supported by the web browser application.

11. The method of claim 10, wherein the knowledge is acquired without re-negotiating a media session with the web browser.

12. The method of claim 10, wherein the second contact center resource is a media controller configured to deliver a music media service for the web browser application, the method further comprising:
if the web browser application supports the third media codec, the media controller delivers the music media service according to the third media codec; and
if the web browser application does not support the third media codec, the media controller transcodes the music to a media codec supported by the web browser application prior to delivering the music media service to the web browser application.

13. The method of claim 9, wherein the negotiating between the processor and the second contact center resource is without re-negotiating a media session with the web browser application.

14. The method of claim 1 further comprising:
upgrading the real-time communication from an audio only communication to an audio and video communication, wherein the upgrading includes:
receiving by the processor a message from the contact center resource for adding video to the real-time communication;
negotiating attributes for the video between the processor and the web browser application, wherein in response to the negotiating, the web browser application displays a video stream transmitted by the contact center resource and further displays a prompt for receiving the customer's consent for the web browser application to access a customer camera; and
in response to receipt of the customer's consent, transmitting by the web browser application a video stream captured by the customer camera to the contact center resource.

15. A system for real-time communication between a customer and a contact center resource, the system comprising:
a processor; and
a memory, wherein the memory stores instructions that, when executed by the processor, cause the processor to:
receive a first offer for a browser-based call from a web browser application, the first offer including a first media codec supported by the web browser application;
modify the first offer and generating a second offer having a second media codec supported by the processor;
generate, by the contact center resource, an answer including a selection of the second media codec in the second offer; and
bridge media exchanged between the web browser application and the contact center resource during the real-time communication, wherein in bridging the media, the instructions cause the processor to transcode the media based on the first media codec for media directed to and from the web browser application, and further transcode the media based on the second media codec for media directed to and from the contact center resource.

16. The system of claim 15, further comprising:
transfer the real-time communication to a second contact center resource for exchanging real-time media between the web browser application and the second contact center resource, wherein the transfer is without changing a peer connection.

17. The system of claim 16 further comprising:
negotiate by the processor a media codec for use for the real-time communication between the processor and the second contact center resource.

18. The system of claim 17, wherein the negotiating includes:
receive by the processor an offer from the second contact center resource including a third media codec supported by the second contact center resource; and
transmit by the processor an answer including a media codec selected based on knowledge of media codecs supported by the web browser application.

19. The system of claim 18, wherein the second contact center resource is a media controller configured to deliver a music media service for the web browser application, the method further comprising:
if the web browser application supports the third media codec, the media controller delivers the music media service according to the third media codec; and
if the web browser application does not support the third media codec, the media controller transcodes the music to a media codec supported by the web browser application prior to delivering the music media service to the web browser application.

20. The system of claim 15 further comprising:
upgrade the real-time communication from an audio only communication to an audio and video communication, wherein the upgrading includes:

receive by the processor a message from the contact center resource for adding video to the real-time communication;

negotiate attributes for the video between the processor and the web browser application, wherein in response to the negotiating, the web browser application displays a video stream transmitted by the contact center resource and further displays a prompt for receiving the customer's consent for the web browser application to access a customer camera; and in response to receipt of the customer's consent, transmit by the web browser application a video stream captured by the customer camera to the contact center resource.

\* \* \* \* \*